(12) United States Patent
Yamazaki et al.

(10) Patent No.: US 9,749,563 B2
(45) Date of Patent: Aug. 29, 2017

(54) FOCAL POINT DETECTION DEVICE AND FOCAL POINT DETECTION METHOD

(71) Applicant: Olympus Corporation, Shibuya-ku, Tokyo (JP)

(72) Inventors: Yukie Yamazaki, Hino (JP); Kazumasa Kunugi, Hachioji (JP); Yoshinobu Omata, Hachioji (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/072,543

(22) Filed: Mar. 17, 2016

(65) Prior Publication Data

US 2016/0198107 A1 Jul. 7, 2016

Related U.S. Application Data

(63) Continuation of application No. PCT/JP2014/070174, filed on Jul. 31, 2014.

(30) Foreign Application Priority Data

Oct. 2, 2013 (JP) ................................ 2013-207773

(51) Int. Cl.
*H04N 5/232* (2006.01)
*H04N 5/369* (2011.01)
(Continued)

(52) U.S. Cl.
CPC ............ *H04N 5/3696* (2013.01); *G02B 7/34* (2013.01); *G02B 7/38* (2013.01); *H04N 5/23212* (2013.01); *H04N 5/23229* (2013.01); *G03B 13/36* (2013.01)

(58) Field of Classification Search
None
See application file for complete search history.

(56) References Cited

U.S. PATENT DOCUMENTS

2009/0244297 A1 10/2009 Toba
2010/0150538 A1 6/2010 Ono et al.

FOREIGN PATENT DOCUMENTS

| JP | 2005-062728 | 3/2005 |
| JP | 2010-008507 | 1/2010 |
| JP | 2013-171257 | 9/2013 |

OTHER PUBLICATIONS

International Search Report to International Application No. PCT/JP2014/070174, mailed on Nov. 4, 2014 (2 pgs.) with translation (2 pgs.).

*Primary Examiner* — Stephen Coleman
(74) *Attorney, Agent, or Firm* — John C. Pokotylo; Straub & Pokotylo

(57) ABSTRACT

A focal point detection device comprising: an image sensor having a focal point detection pixel, a pixel data generation section to generate pixel data of a basis part and a reference part corresponding to a predetermined AF area using an output of the focal point detection pixel, a plurality of filter sections having different frequency characteristics to perform filter processing on the pixel data, a detection section to detect contrast of subject image data configured with a plurality of pieces of pixel data of the basis part and the reference part, and a calculation section to select a filter section from among the plurality of filter sections depending on the contrast output by the detection section, to perform correlation calculation using pixel data on which the filter processing is performed by the selected filter section to calculate a defocus amount.

12 Claims, 20 Drawing Sheets

(51) Int. Cl.
*G02B 7/34* (2006.01)
*G02B 7/38* (2006.01)
G03B 13/36 (2006.01)

FIG. 3

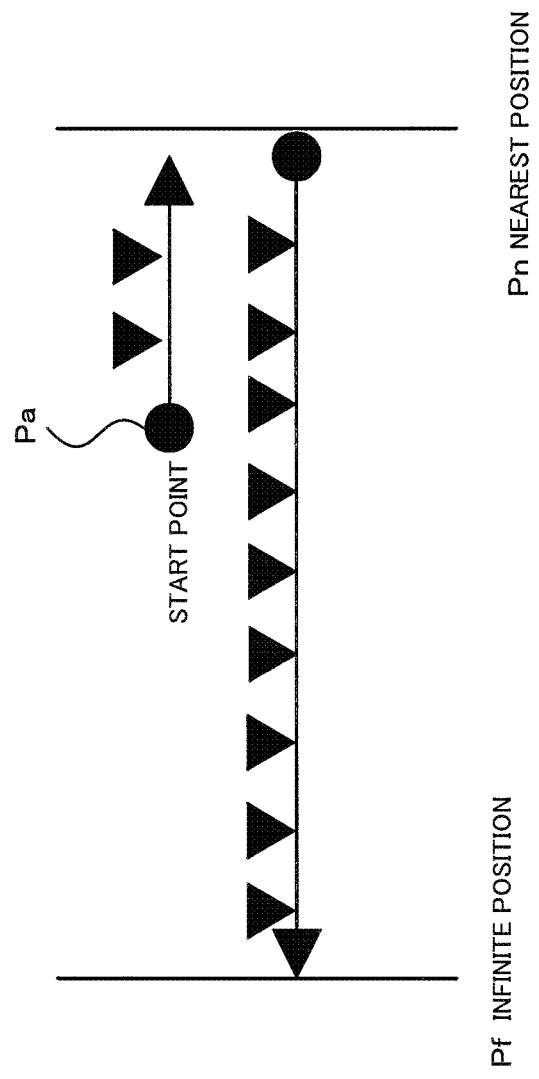

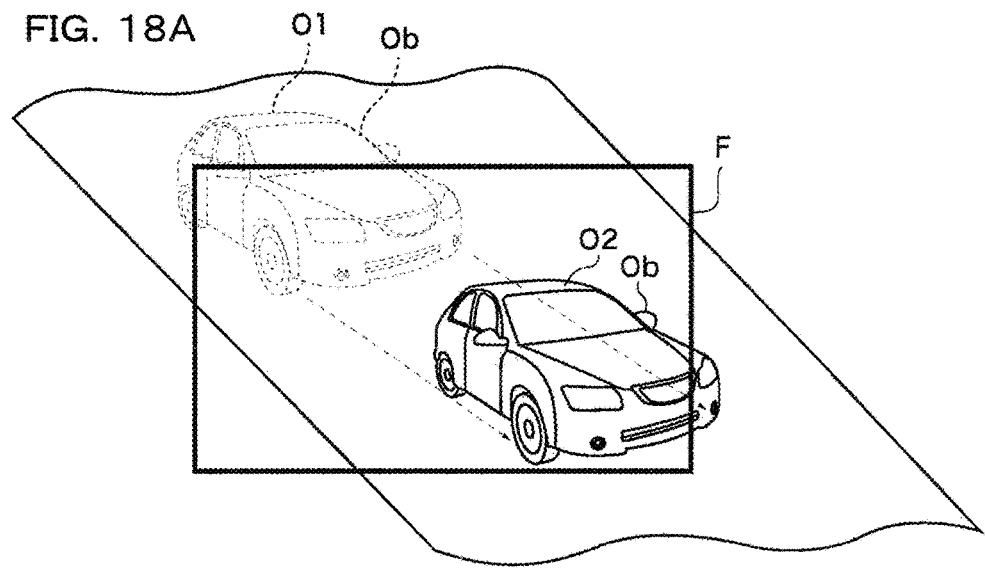
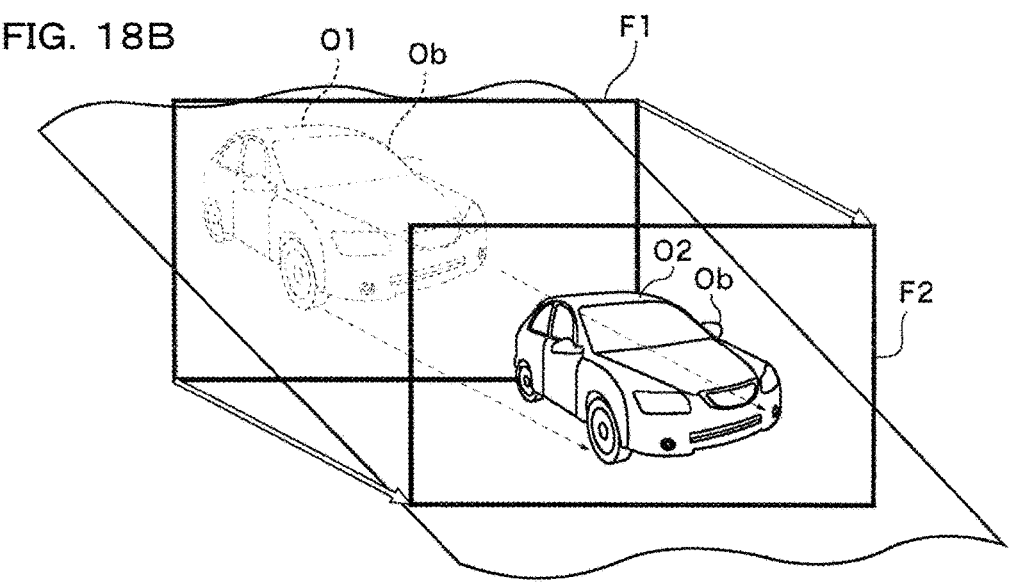

FOCAL POINT DETECTION DEVICE AND FOCAL POINT DETECTION METHOD

This application is a Continuation Application of PCT Application No. PCT/JP2014/070174, filed on Jul. 31, 2014 and based upon and claiming the benefit of priority from prior Japanese Patent Application No. 2013-207773, filed on Oct. 2, 2013, the entire contents of all of which are incorporated herein by reference.

BACKGROUND OF THE INVENTION

1. Field of the Invention

The present invention relates to a focal point detection device and a focal point detection method, and, particularly, relates to a focal point detection device and a focal point detection method which have a photographing lens including a focus lens, generate image data by receiving subject images pupil-divided through the photographing lens, and perform focal point detection using the image data.

2. Description of Related Art

There is known a focal detection device using a phase difference AF method which generates image data by receiving subject images pupil-divided through a photographing lens, performs correlation calculation using the image data, and obtains a phase difference to perform drive to a focusing position. In the phase difference AF method, it is difficult to perform phase difference AF detection in a state in which a defocus amount is large (largely blurred state). Accordingly, in a focal point detection device disclosed in Japanese Patent Laid-Open Publication No. 2010-139942 (in the following, called "Patent Literature 1"), a lens position is driven from a first position to a second position, and a drive direction is determined depending on a contrast evaluation value obtained at this time.

In the focal point detection device disclosed in above Patent Literature 1, it is possible to determine an appropriate focusing drive direction. However, in the determination of the drive direction, it is necessary to drive the lens position from the first position to the second position, which increases time for focusing. In particular, it takes a long time to perform the focusing of a subject such as a subject having a low contrast and a subject having a large defocus amount for which it is difficult to use the phase difference AF method.

SUMMARY OF THE INVENTION

The present invention aims to provide a focal point detection device and a focal point detection method which can perform focusing quickly even for a largely blurred subject.

A focal point detection device according to a first aspect of the present invention is a focal point detection device, comprising: an image sensor having a focal point detection pixel where an incident direction of an incident light flux is restricted and an imaging pixel where the incident direction of the incident light flux is not restricted; a pixel data generation section to generate focal point detection pixel data of a basis part and a reference part corresponding to a predetermined AF area using an output of the focal point detection pixel; a plurality of filter sections having different frequency characteristics to perform filter processing on the pixel data; a detection section to detect contrast of subject image data configured with a plurality of pieces of pixel data of the basis part and the reference part; a calculation section to select a filter section from among the plurality of filter sections depending on the contrast output by the detection section, to perform correlation calculation using pixel data obtained by performing filter processing on the pixel data of the basis part and the reference part with the selected filter section, and to calculate a defocus amount; a moving object discrimination section to discriminate whether a subject is a moving object or not, using imaging data output from the imaging pixel; and a reliability determination section to determine reliability of an output from the calculation section, wherein the plurality of filter sections includes a first filter processing section having a predetermined frequency characteristic and a second filter processing section having a frequency characteristic which exhibits a larger gain for a low frequency component than the frequency characteristic of the first filter processing section, the calculation section selects the second filter processing section to perform calculation when the contrast output by the detection section is lower than a predetermined value, and the calculation section selects the second filter processing section to perform calculation when the moving object determination section determines that the subject is a moving object while the correlation calculation by the calculation section and the reliability determination by the reliability determination section are carried out repeatedly on the basis of pixel data obtained by repeatedly performing imaging operation by the image sensor, and also when the reliability determination section continues to determine that reliability is low for a predetermined time or longer while the calculation section selects the first filter processing section to perform calculation.

A focal point detection device according to a second aspect of the present invention is a focal point detection device, comprising: an image sensor having a focal point detection pixel where an incident direction of an incident light flux is restricted; a pixel data generation section to generate focal point detection pixel data of a basis part and a reference part corresponding to a predetermined AF area using an output of the focal point detection pixel; a plurality of filter sections having different frequency characteristics to perform filter processing on the pixel data; a detection section to detect contrast of subject image data configured with a plurality of pieces of pixel data of the basis part and the reference part; a calculation section to select a filter section from among the plurality of filter sections depending on the contrast output by the detection section, to perform correlation calculation using pixel data obtained by performing filter processing on the pixel data of the basis part and the reference part with the selected filter section, and to calculate a defocus amount; a pan•tilt detection section to detect pan or tilt operation of the focal point detection device; and a reliability determination section to determine reliability of an output from the calculation section, wherein the calculation section selects the second filter processing section to perform calculation when the moving object determination section determines that the pan•tilt detection section determines that pan•tilt operation is performed while the correlation calculation by the calculation section and the reliability determination by the reliability determination section are carried out repeatedly on the basis of pixel data obtained by repeatedly performing imaging operation by the image sensor, and also when the reliability determination section continues to determine that reliability is low for a predetermined time or longer while the calculation section selects the first filter processing section to perform calculation.

A focal point detection method according to a third aspect of the present invention is a focal point detection method of a focal point detection device including an image sensor having a focal point detection pixel where an incident direction of an incident light flux is restricted, and a plurality of filter sections having different frequency characteristics to perform filter processing on the pixel data, wherein the plurality of filter sections includes a first filter processing section having a predetermined frequency characteristic and a second filter processing section having a frequency characteristic which exhibits a larger gain for a low frequency component than the frequency characteristic of the first filter processing section, the method comprising: generating focal point detection pixel data of a basis part and a reference part corresponding to a predetermined AF area using an output of the focal point detection pixel; detecting contrast of subject image data configured with a plurality of pieces of pixel data of the basis part and the reference part; selecting a filter section from among the plurality of filter sections depending on the detected contrast; performing correlation calculation using pixel data obtained by performing filter processing on the pixel data of the basis part and the reference part with the selected filter section, to calculate a defocus amount; and selecting the second filter processing section to perform calculation when a subject is determined to be a moving object on the basis of imaging data output from the imaging pixel while the correlation calculation and reliability determination of the correlation calculation are carried out repeatedly on the basis of pixel data obtained by repeatedly performing imaging by the image sensor, and also when it is continued to be determined that reliability is low in the result of operation for a predetermined time or longer while the first filter processing section is selected and the calculation is performed.

A focal point detection method according to a fourth aspect of the present invention is a focal point detection method of a focal point detection device including an image sensor having a focal point detection pixel where an incident direction of an incident light flux is restricted, a plurality of filter sections having different frequency characteristics to perform filter processing on the pixel data, wherein the plurality of filter sections includes a first filter processing section having a predetermined frequency characteristic and a second filter processing section having a frequency characteristic which exhibits a larger gain for a low frequency component than the frequency characteristic of the first filter processing section, and a pan•tilt detection section to detect pan or tilt operation of the focal point detection device, the method comprising: generating focal point detection pixel data of a basis part and a reference part corresponding to a predetermined AF area using an output of the focal point detection pixel; detecting contrast of subject image data configured with a plurality of pieces of pixel data of the basis part and the reference part; selecting a filter section from among the plurality of filter sections depending on the detected contrast; performing correlation calculation using pixel data obtained by performing filter processing on the pixel data of the basis part and the reference part with the selected filter section, to calculate a defocus amount; and selecting the second filter processing section to perform the correlation calculation when the pan•tilt detection section determines that a pan•tilt operation is performed while the correlation calculation and reliability determination of the correlation calculation are carried out repeatedly on the basis of pixel data obtained by repeatedly performing imaging by the image sensor, and also when it is continued to be determined that the reliability is low for a predetermined time or longer while the first filter processing section is selected and the correlation calculation is performed.

BRIEF DESCRIPTION OF THE DRAWINGS

FIG. 3 is a diagram showing arrangement of pixels configured with a phase difference AF detection pixel and an imaging pixel in an image sensor of a camera according to an embodiment of the present invention.

FIG. 8A and FIG. 8B are diagrams showing a filter A in a camera according to an embodiment of the present invention, wherein FIG. 8A is a block diagram showing a configuration of the filter A and FIG. 8B is a diagram showing a frequency characteristic of the filter A.

FIG. 9A and FIG. 9B are diagrams showing a filter B in a camera according to an embodiment of the present invention, wherein FIG. 9A is a block diagram showing a configuration of the filter B and FIG. 9B is a diagram showing a frequency characteristic of the filter B.

FIG. 17 is a diagram showing an example of lens scan drive in a camera according to an embodiment of the present invention.

FIG. 18A and FIG. 18B are diagrams showing a state of photographing a moving object in a camera according to an embodiment of the present invention.

DETAILED DESCRIPTION OF THE PREFERRED EMBODIMENTS

Hereinafter, there will be explained preferable embodiments by the use of a digital camera (in the following, simply called "camera") to which a focal point detection device according the present invention is applied, with reference to the drawings. The digital camera receives and photoelectrically converts a subject image divided into two images (refer to FIG. 4 or the like to be described below), and performs correlation calculation using pixel data of a basis part and a reference part corresponding to a predetermined AF area to calculate a defocus amount (refer to a defocus amount calculation section/reliability evaluation section 37 in FIG. 5 and FIG. 2 or the like to be described below).

Figure 1:
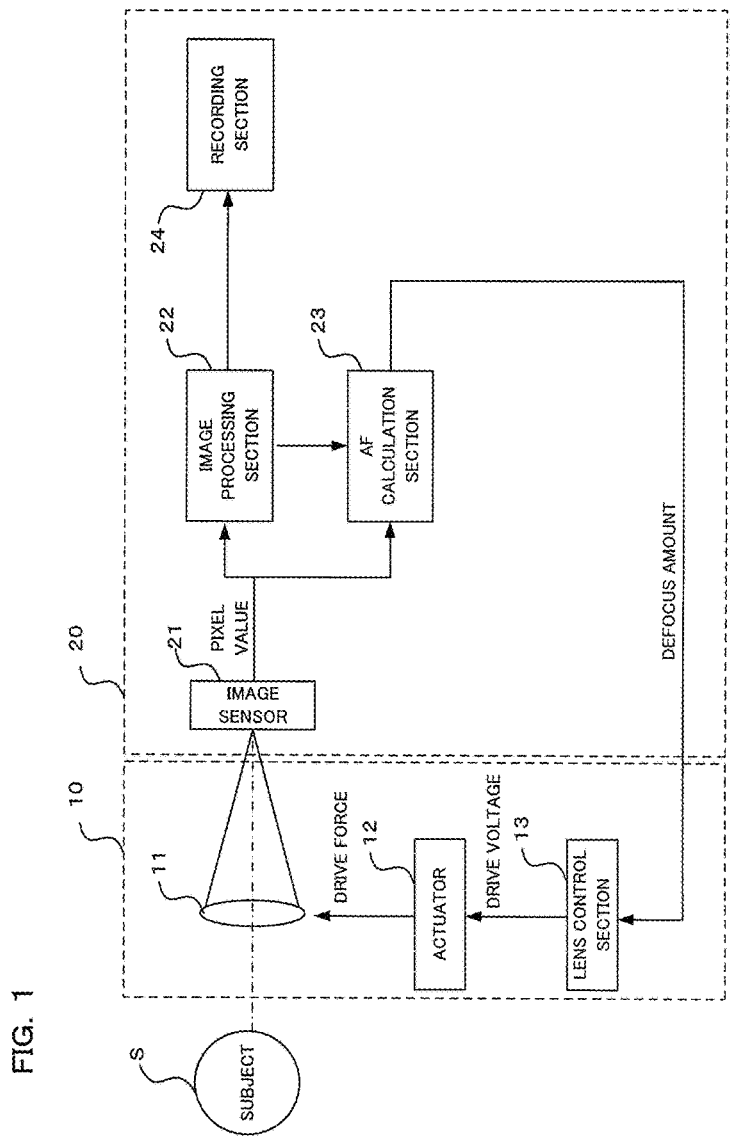
FIG. 1 is a block diagram mainly showing an electrical configuration of a camera according to an embodiment of the present invention.

FIG. 1 is a block diagram mainly showing an electrical configuration of a camera according to an embodiment of the present invention. The camera according to the present embodiment includes an interchangeable lens barrel 10 and a camera main body 20. The interchangeable lens barrel 10 and the camera main body 20, while configured separately in the present embodiment, obviously may be configured in a unit as in a typical compact camera.

A photographing lens 11 is provided within the interchangeable lens barrel 10. The photographing lens 11 is configured with a plurality of optical lenses for forming an optical image of a subject S and includes a focus lens. Further, an actuator 12 and a lens control section 13 are provided within the interchangeable lens barrel 10.

The lens control section 13 includes a CPU (Central Processing Unit) to control the interchangeable lens barrel 10 and a peripheral circuit thereof. The lens control section 13 receives a defocus amount from an AF calculation section 23 within the camera main body 20, and controls the actuator 12 using this information. The actuator 12 moves the focus lens within the photographing lens 11 in the optical axis direction to perform focusing. Here, the position of the focus lens is detected by a lens position detection section (not shown in the drawing), and transmitted to the camera main body 20 via a communication section (not shown in the drawing).

An image sensor 21, an image processing section 22, the AF calculation section 23, and a recording section 24 are provided within the camera main body 20. The image sensor 21 is disposed on the optical axis of the photographing lens 11 around an image focusing position of the subject image. The image sensor 21 includes a plurality of pixels each having a photoelectric conversion section to convert a subject image (optical image) into an electrical signal. The plurality of pixels includes a phase difference AF detection pixel (also called focal point detection pixel) configured so as to restrict the incident direction of an light flux entering the pixel and an imaging pixel (also called normal pixel) configured so as not to restrict the incident direction of an light flux entering the pixel compared with the phase difference AF detection pixel, and the plurality of pixels is arranged two-dimensionally. The arrangement of the phase difference AF detection pixels and the imaging pixels of the image sensor 21 will be described below by the use of FIG. 3 and FIG. 4.

The image sensor 21 outputs pixel values output from the phase difference AF detection pixel and the imaging pixel to the image processing section 22 and the AF calculation section 23. The image processing section 22 has an image processing circuit and inputs the pixel value from the imaging pixel out of the pixel values to perform image processing for a live-view display image and a recording image. Further, the image processing section 22 outputs the image data processed for recording to the recording section 24.

The recording section 24 has an electrically-rewritable nonvolatile memory and inputs the recording image data for recording. Further, the image processing section 22 detects the face of the object using the pixel value and outputs the center coordinate position of this face, and further detects an organ such as an eye in the face and outputs the specific coordinate position of this organ. Further, the image processing section 22 performs subject tracking using the pixel value.

The AF calculation section 23 includes a CPU (Central Processing Unit) to control the camera main body 20 and a peripheral circuit thereof. The AF calculation section 23 inputs the pixel value from the phase difference AF detection pixel out of the pixel values, and performs AF calculation based on the phase difference AF. In the AF calculation, the AF calculation section 23 sets a ranging area corresponding to the position of the phase difference AF detection pixel based on the center coordinate position and the specific coordinate position obtained from the image processing section 22, and calculates a defocus amount (including a defocus direction) and a contrast evaluation value for this set ranging area. The focus lens within the photographing lens 11 is driven to a focusing position according to these calculated defocus amount and contrast evaluation value. Further, in the case that the subject has periodicity, the AF calculation section 23 selects an extreme value of a correlation value for calculating the defocus amount so as to realize the drive to a true focusing position.

Figure 2:
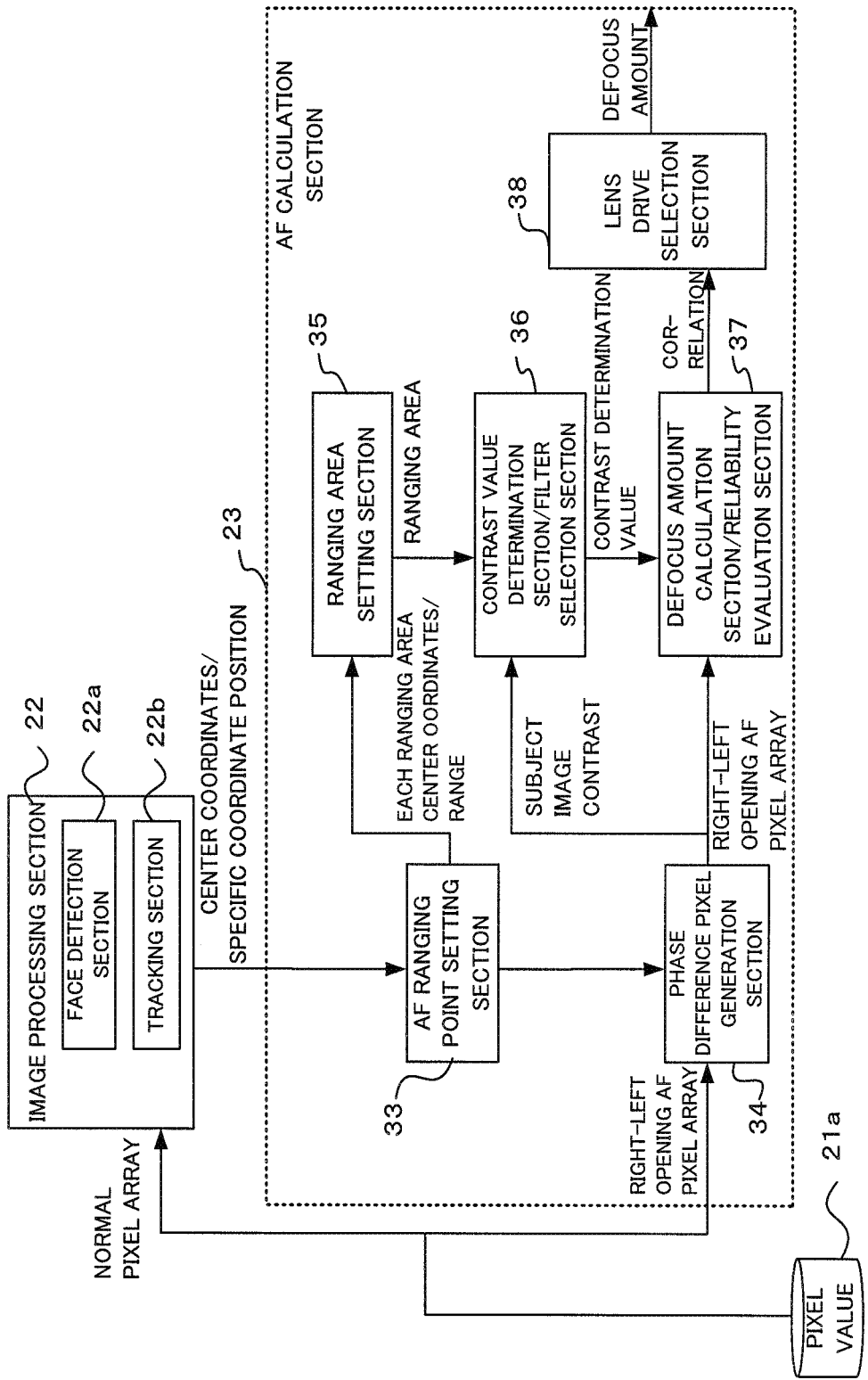
FIG. 2 is a block diagram showing details of an AF calculation section of a camera according to an embodiment of the present invention.

Next, details of the AF calculation section 23 will be explained by the use of FIG. 2. A pixel value 21a is a pixel value output from the image sensor 21 and stored temporarily in an SDRAM (Synchronous Dynamic Random Access Memory) (not shown in the drawing) or the like.

Further, a face detection section 22a is provided within the image processing section 22. The face detection section 22a determines whether or not a face exists in the subject image, using the pixel value of the imaging pixel (normal pixel) output from the image sensor 21, and, when the face is included, detects the position (center coordinate position), the size, and the like thereof. Further, the face detection section 22a performs the detection of an organ such as a right eye, a left eye, and a nose, and also detects the specific coordinate position of the organ. The center coordinate position and the specific coordinate position detected by the face detection section 22a are output to an AF ranging point setting section 33 within the AF calculation section 23.

Further, a tracking section 22b is provided within the image processing section 22. This tracking section 22b performs the tracking of the subject using the pixel value of the imaging pixel output from the image sensor 21. For example, for the position of a face detected by the face detection section 22a or the position of a subject (tracking target) designated by a photographer, the tracking section 22b compares pixel values every time a pixel value is output from the image sensor 21 and detects where the same subject (tracking target) has moved, to perform tracking. The center coordinate position and the specific coordinate position of the tracking target detected by the tracking section 22b are output to the AF ranging point setting section 33 within the AF calculation section 23.

On the basis of the center coordinate position or the specific coordinate position detected by the face detection section 22a or the tracking section 22b, the AF ranging point setting section 33 sets a ranging point corresponding to such a position. The image sensor 21 is divided into a plurality of ranging areas, and, out of the plurality of ranging areas, a ranging point near the center coordinate position or the specific coordinate position is set and the center coordinate in each of the set ranging points is output to a ranging area setting section 35.

A phase difference pixel generation section 34 inputs the image data of the phase difference AF detection pixel out of the pixel values 21a, generates a phase difference AF detection pixel array, and outputs the pixel array to the defocus amount calculation section/reliability evaluation section 37. The phase difference pixel generation section 34 functions as a pixel data generation section to generate focal point detection pixel data of the basis part and the reference part (refer to the windows WL and WR in FIG. 5) corresponding to a predetermined AF area using the output of the phase difference AF detection pixel (focal point detection pixel).

The ranging area setting section 35 inputs the center coordinate in each of the ranging areas from the AF ranging point setting section 33, sets a ranging area, and outputs the ranging area to a contrast value determination section/filter selection section 36. A plurality of ranging areas is provided in the present embodiment, and the position of each of the ranging areas is preliminarily fixed. The most appropriate ranging area is set by the use of information such as the center area from the AF ranging point setting section 33 and the size of a main subject (e.g., face). Note that, depending on the center area, the size of the main subject, or the like, there is a case that the main subject exists across the plurality of ranging areas, and, in that case, a plurality of ranging areas is set.

The contrast value determination section/filter selection section 36 inputs the pixel value of the focal point detection pixel out of the pixel values 21a, and also inputs the center coordinate in each of the ranging areas from the AF ranging point setting section 33. By the use of these pieces of information, the contrast evaluation value is calculated for the set ranging area and the contrast value is determined. Then, by the use of the determination result, a filter to be used in filter processing is selected as will be described below. The contrast value determination section/filter selection section 36 functions as a detection section to detect the contrast of the subject image data configured with a plurality of pieces of pixel data of the basis part and the reference part. The determination result of the contrast evaluation value and the filter selection result are output to the defocus amount calculation section/reliability evaluation section 37.

In the calculation of the defocus amount by the phase difference AF method, the defocus amount calculation section/reliability evaluation section 37 performs the filter processing on the image data of the phase difference AF detection pixel array from the phase difference pixel generation section 34 using the filter selected by the contrast value determination section/filter selection section 36. Accordingly, the defocus amount calculation section/reliability evaluation section 37 has a plurality of filters. The plurality of filters has different frequency characteristics, and functions as a plurality of filter sections to perform the filter processing on the pixel data. The filter will be described below by the use of FIG. 8A to FIG. 11.

The defocus amount calculation section/reliability evaluation section 37 calculates a defocus amount by the phase difference AF method using the filtered image data, and outputs the correlation calculation result and the defocus amount in each of the ranging areas to a lens drive selection section 38. This defocus amount calculation section/reliability evaluation section 37 functions as a calculation section which selects a filter section from among the plurality of filter sections depending on the contrast output from the detection section, performs the correlation calculation on the basis of pixel data obtained by performing filter processing on the pixel data of the basis part and the reference part with the selected filter section, and calculates the defocus amount. Further, the defocus amount calculation section/reliability evaluation section 37 functions as a reliability determination section to determine the reliability of the output from the calculation section. The defocus amount calculation by the phase difference AF and the reliability determination will be described below by the use of FIG. 5 to FIG. 7.

The lens drive selection section 38 inputs the correlation calculation result of the ranging area and the defocus amount from the defocus amount calculation section/reliability evaluation section 37, and performs the selection of a lens drive method and the selection of a lens drive direction. In the present embodiment, the lens drive method includes defocus drive of driving the focus lens to a lens position corresponding to the input defocus amount and lens scan drive of obtaining the contrast evaluation value while scanning the focus lens between the nearest end and the infinity end.

The lens drive selection section 38 selects either one of the lens drive methods depending on the correlation calculation result and the like. Further, the lens drive direction includes the nearest end direction and the infinity direction, and is determined depending on the correlation calculation result and the like. The lens drive selection section 38 outputs a defocus amount, and the lens control section 13 (refer to FIG. 1) performs the drive control of the focus lens within the photographing lens 11 using the defocus amount.

Figure 3:
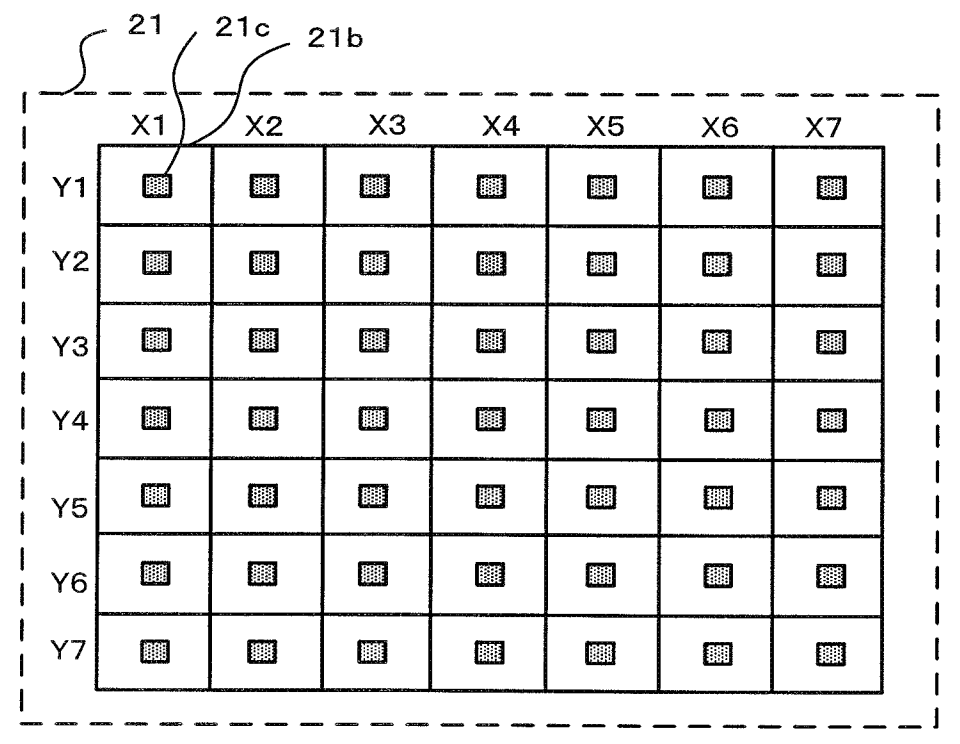

Next, the image sensor 21 and the ranging area will be explained by the use of FIG. 3 and FIG. 4. In the example of FIG. 3, the image sensor 21 is divided into X1 to X7 in the row direction and Y1 to Y7 in the column direction, and each one of these 49 areas corresponds to the ranging area. The area indicated by sign 21b is expressed by (X1, Y1). The center point 21c in each of the ranging areas corresponds to the center coordinate of the ranging area.

Figure 4:
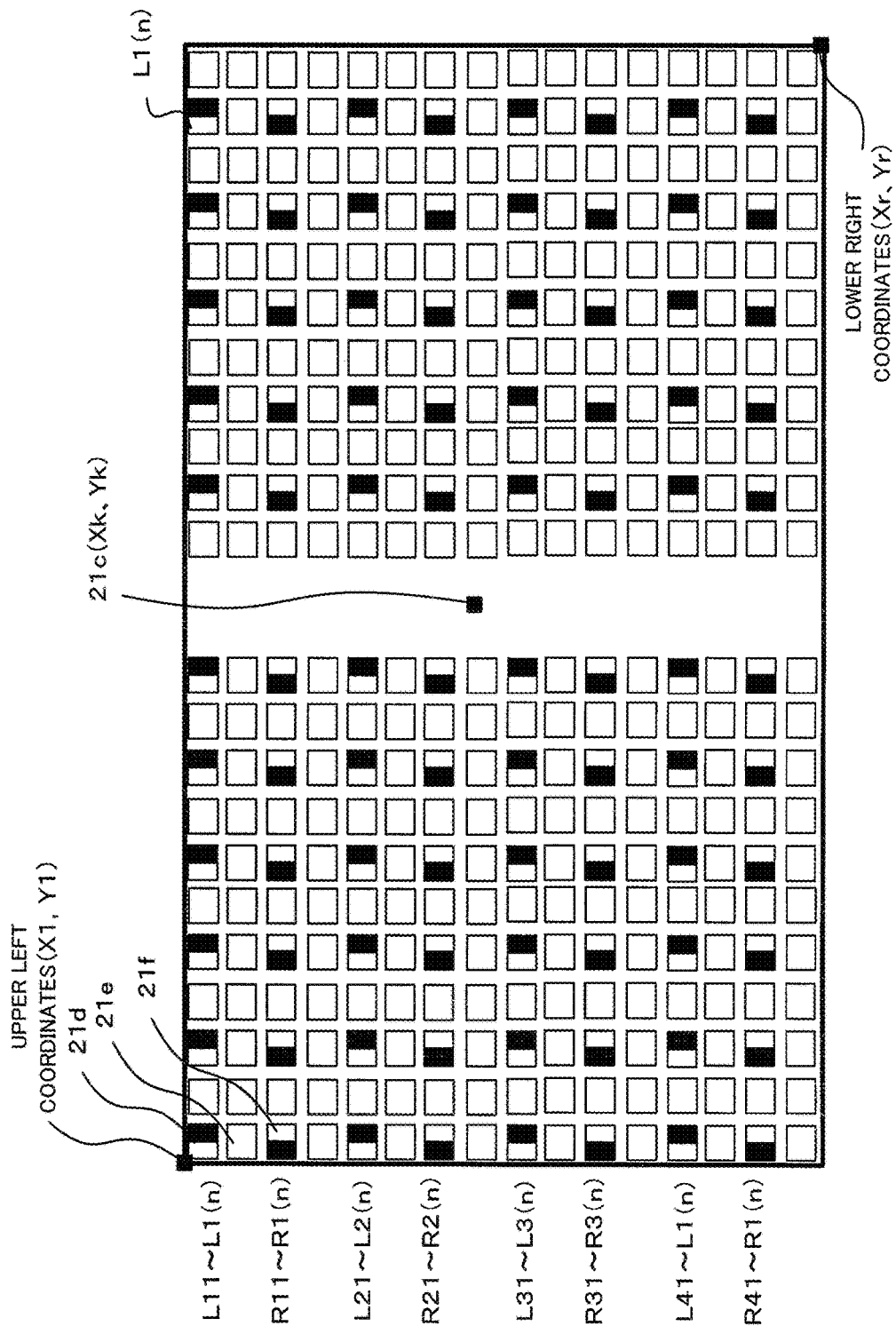
FIG. 4 is an enlarged diagram of one ranging area in an image sensor of a camera according to an embodiment of the present invention.

FIG. 4 shows an arrangement example of the pixels in one of the ranging areas. The inside in each of the ranging areas 21b shown in FIG. 3 is configured with the phase difference AF detection pixels and the imaging pixels as shown in FIG. 4.

In the ranging area shown in FIG. 4, a left-opening phase difference AF detection pixel 21d, the imaging pixel 21e, and a right-opening phase difference AF detection pixel 21f are arranged alternately in the column direction. That is, in the leftmost column, L11, L21, L31, and L41 are the left-opening phase difference AF detection pixels 21d, R11, R21, R31, and R41 are the right-opening phase difference AF detection pixels 21f, and the imaging pixels 21e are arranged therebetween. Then, the second leftmost column includes only the imaging pixels 21e. After that, the column including the phase difference AF detection pixels and the column including only the imaging pixels are repeatedly arranged alternately.

Note that, while the column including the phase difference AF detection pixels and the column including only the imaging pixels are arranged alternately in the present embodiment, obviously two or more columns including only the imaging pixels may be arranged between the columns including the phase difference AF detection pixels.

In the AF pixel array generated by the phase difference pixel generation section 34 (refer to FIG. 2), the average pixel value of the left-opening AF detection pixels and the average pixel value of the right-opening AF detection pixels are calculated for each of the pixel arrays. In the present embodiment, since each of the pixel arrays includes four pixels, the pixel values are added in each of the pixel arrays and divided by four. That is, the average pixel value is obtained by the following calculation.

Left-opening AF detection pixel array:

$$L1 = (L11 + L21 + L31 + L41)/4$$

$$L2 = (L12 + L22 + L32 + L42)/4$$

$$L3 = (L13 + L23 + L33 + L43)/4$$

$$...$$

$$Ln = (L1(n) + L2(n) + L3(n) + L4(n))/4$$

Right-opening AF detection pixel array:

$$R1 = (R11 + R21 + R31 + R41)/4$$

$$R2 = (R12 + R22 + R32 + R42)/4$$

$$R3 = (R13 + R23 + R33 + R43)/4$$

$$...$$

$$Rn = (R1(n) + R2(n) + R3(n) + R4(n))/4$$

Further, in the example shown in FIG. 4, the upper left coordinates are (X1, Y1), the lower right coordinates are (Xr, Yr), and the ranging area center coordinates 21c are (Xk, Yk). The center coordinates (Xc[k], Yc[k]) of the ranging area indicate a position where optional lengths (a[k], b[k]) are added to the face center coordinates/specific coordinates (Xco, Yco) for each of the ranging areas (k=1 to 7, in the present embodiment), that is $$Xc[k]=Xco+a[k], \text{ and } Yc[k]=Yco+b[k].$$

Here, k is a ranging area number, that is, k=0, 1, 2, . . . Area_num-1 (Area_num: number of ranging areas).

Figure 5:
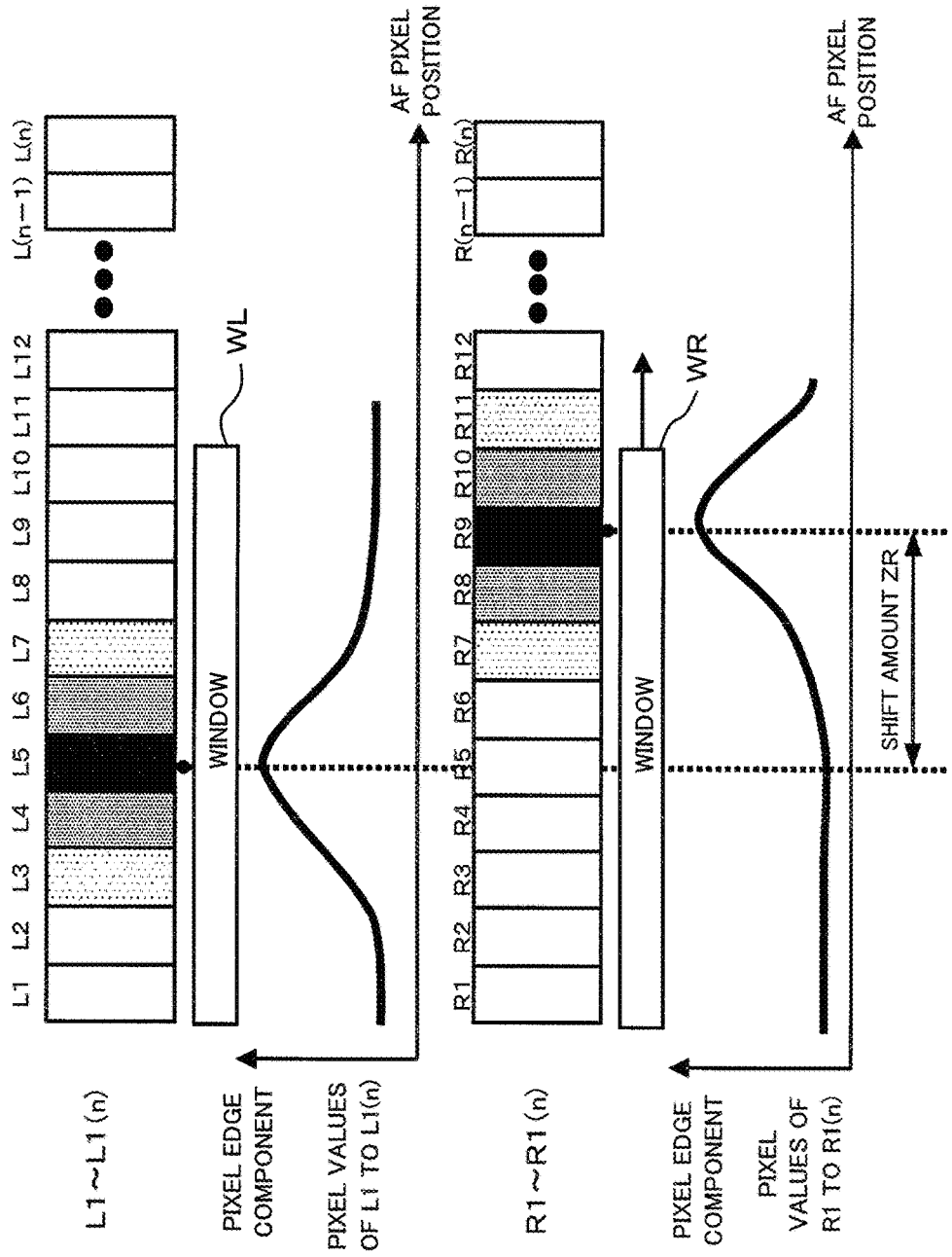
FIG. 5 is a diagram to explain a ranging method in a camera according to an embodiment of the present invention.
Figure 6:
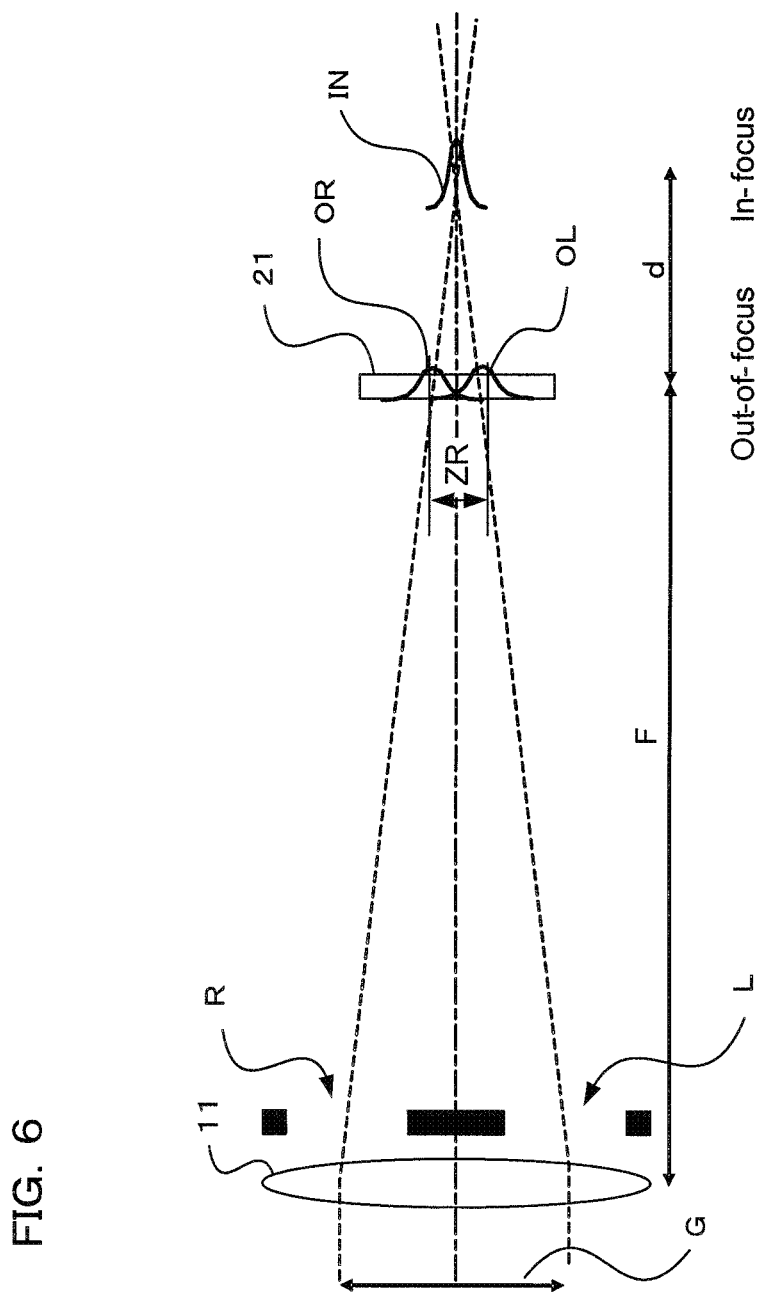
FIG. 6 is a diagram to explain a ranging method in a camera according to an embodiment of the present invention.
Figure 7:
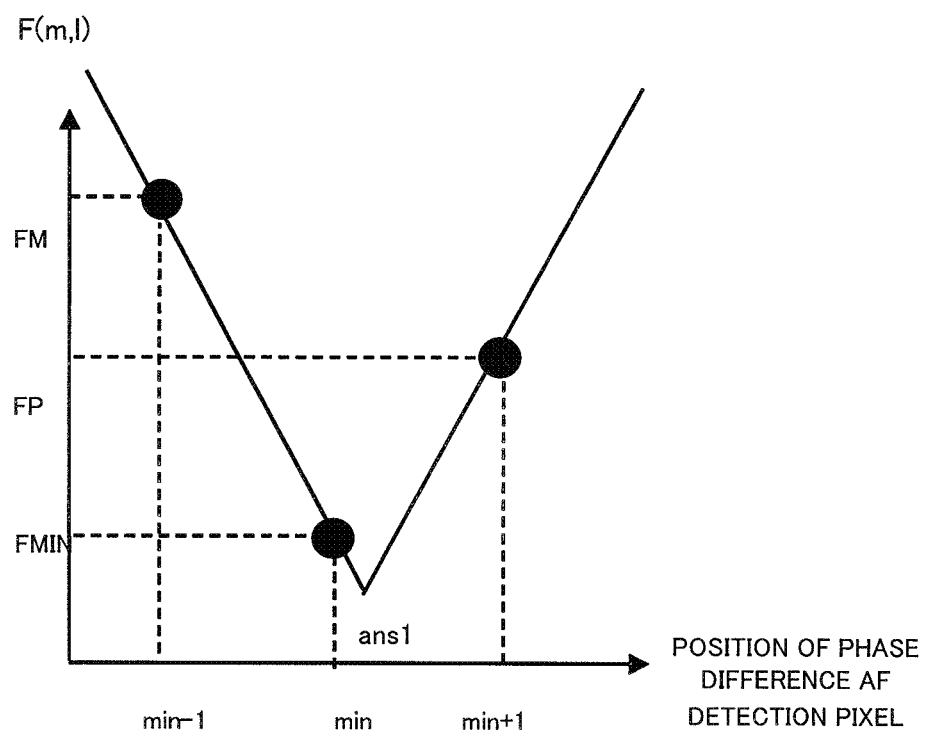
FIG. 7 is a graph showing a correlation calculation result in a camera according to an embodiment of the present invention.

The defocus amount calculation section/reliability evaluation section 37 adds/subtracts (c[k], d[k]) (c[k] and d[k] are predetermined values for each of the areas and x and y direction ranges of the correlation calculation) to/from the ranging area center (Xc[k], Yc[k]), defines the upper left coordinates (X1[k], Y1[k])=(Xc[k]−c[k], Yc[k]−d[k]) and the lower right coordinates (Xr[k], Yr[k]=(Xc[k]+c[k], Yc[k]+d[k]), and performs the calculation of obtaining the defocus amount based on the phase difference AF to be explained by the use of FIG. 5 to FIG. 7, within this range.

FIG. 6 is a diagram showing the ranging principle in the phase difference AF. When a right opening R and a left opening L are provided in the light flux from the photographing lens 11, and an image OR corresponding to an image output based on a light flux only from the right opening R and an image OL corresponding to an image output based on a light flux only from the left opening L are compared with each other on the image sensor 21, both images OR and OL are shifted from each other by a shift amount ZR when the images are not focused. Further, both images IN coincide with each other at a focusing position which is apart from the image sensor 21 by a defocus amount d. Accordingly, the shift amount ZR is obtained, the defocus amount d is obtained from the shift amount ZR, and the photographing lens 11 is moved to the focusing position according to the defocus amount d. Here, sign G in FIG. 6 indicates the distance between the gravity centers of the right and left openings, and F indicates the distance from the imaging plane to the pupil.

The top row of FIG. 5 shows the arrangement positions of the left-opening phase difference AF detection pixel array L1 to L (n), and the second row shows pixel values (pixel edge components) corresponding to this AF detection pixel array (corresponding to the image OL in FIG. 6). Further, the third row of FIG. 5 shows the arrangement positions of the right-opening phase difference AF detection pixel array R1 to R(n), and the fourth row (bottom row) shows pixel values (pixel edge components) corresponding to this AF detection pixel array (corresponding to the image OR in FIG. 6). Therefrom, the correlation of the subject images projected onto the right and left opening pixel arrays are obtained. The difference between the phase difference AF detection pixel positions where the shapes of the subject images have the best similarity is the shift amount (parallax) ZR.

The shift amount is obtained by means of shifting a window WR corresponding to the right-opening pixel array sequentially by one pixel while fixing a window WL corresponding to the left-opening pixel array, and when finishing the movement of the window WR corresponding to the right-opening pixel array, next shifting the window WL corresponding to the left-opening pixel array sequentially by one pixel while fixing the window WR corresponding to the right-opening pixel array, for example. At this time, an evaluation value Fm is obtained from an accumulated value of the differences between the left-opening phase difference AF detection pixel values in the window WL and the right-opening phase difference AF detection pixel values within the window WR. The shift amount where this evaluation value Fm takes the minimum value is the shift amount ZR.

FIG. 7 is a graph showing the position of the phase difference AF detection pixel near a point where the evaluation value Fm takes the minimum value, and Fm. In this graph, the evaluation value Fm takes the minimum value at a position min of the phase difference AF detection pixel. Here, since the evaluation value Fm is discrete data, interpolation processing is performed by using a plurality of evaluation values Fm near the minimum value to obtain the true minimum value and the shift amount ZR is calculated.

When the shift amount ZR is obtained, the defocus amount d is calculated from the shift amount ZR by following Formula (1). That is, from the relationship shown in FIG. 6, $$G:ZR=(F+d):d$$

$$(F+d) \times ZR - dG = 0$$

$$d = F \times ZR/(G-ZR) \quad \text{Formula (1)}$$

where d: defocus amount, F: distance from the image sensor to the pupil, ZR: shift amount, and G: distance between the right and left opening gravity centers.

The defocus amount calculation section/reliability evaluation section 37 uses a correlation value slope Fs of the evaluation value Fm as a reliability value of the phase difference AF. That is, in the example shown in FIG. 7, the slope Fs [k] of a straight line connecting the minimum value (FMIN) of the evaluation value Fm and a larger evaluation value FM out of the two Fm values neighboring this minimum value is calculated and output as an evaluation value expressing the reliability. A minimum value ans1 approximated by the use of the slope Fs [k] indicates a shift amount where the two right-opening and left-opening images have the highest correlation with each other and this value becomes a value between two images. The shift amount ans1 is substituted for ZR in above Formula (1) and the defocus amount d is calculated.

Figure 8A:
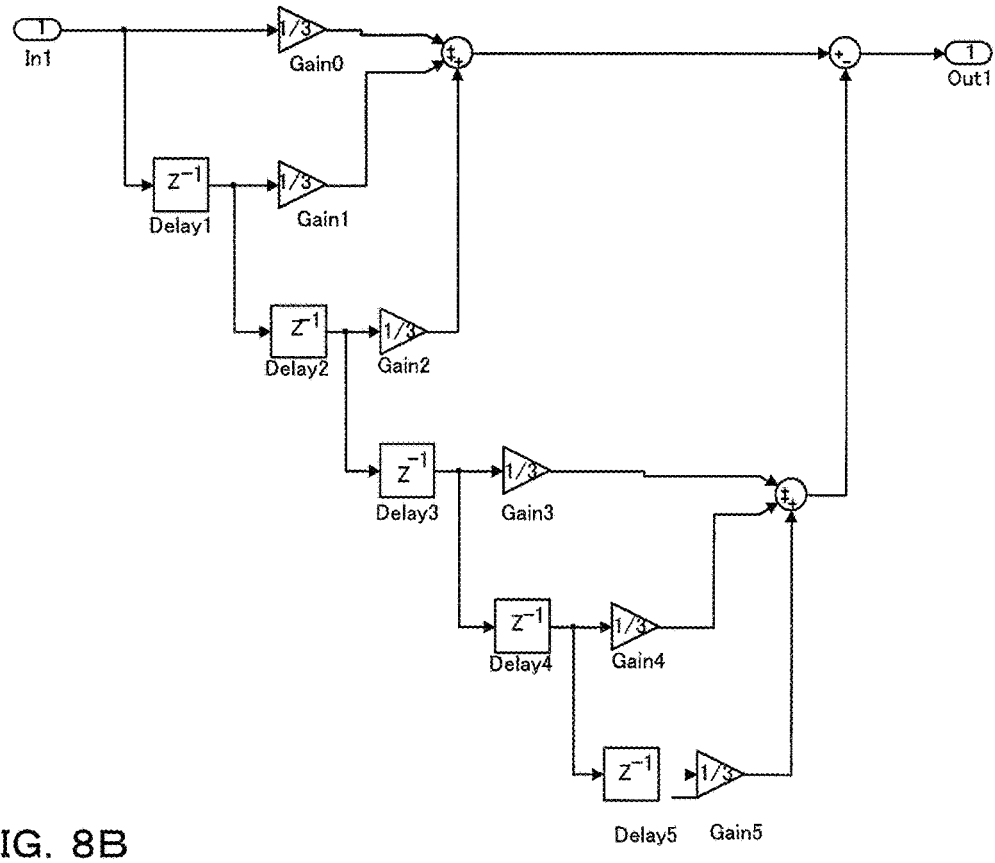
Figure 8B:
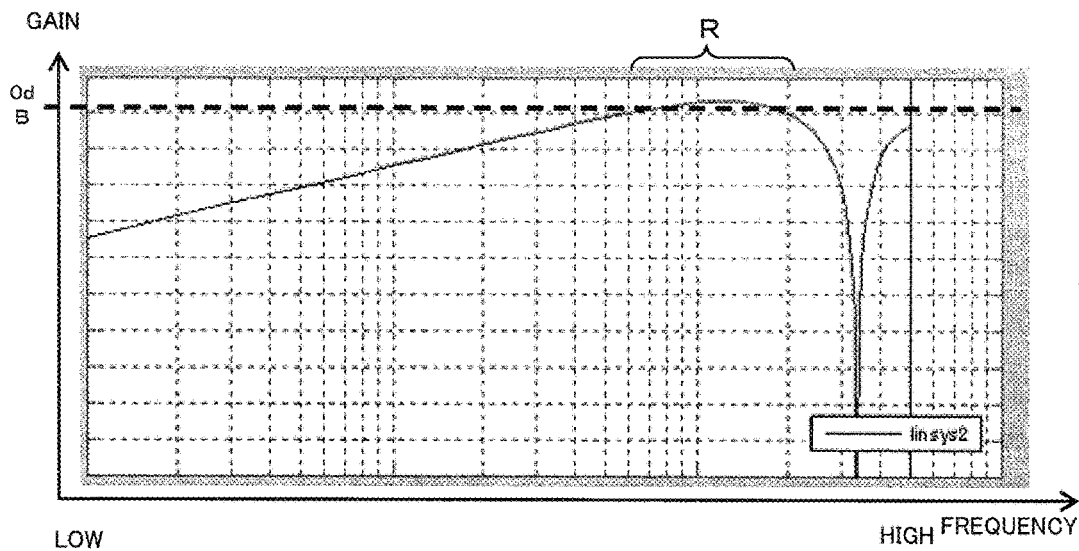

Next, the filter in the present embodiment will be explained by the use of FIG. 8A to FIG. 11. FIG. 8A is a block diagram showing a configuration of a filter A, and FIG. 8B is a diagram showing a frequency characteristic of the filter A. The filter A is configured with delay circuits Delay1 to Delay5, gain ⅓ amplifiers 0 to 5, and three adder circuits as shown in FIG. 8A. When the image data of the phase difference AF detection pixel array is input to an input In from the phase difference pixel generation section 34, filter processing is performed and a signal applied with the frequency characteristic shown in FIG. 8B is output from an output Out1.

This filter A emphasizes only a high frequency component, and is used when a ranging accuracy is considered to be important. That is, in FIG. 8B, the filter A has a gain exceeding 0 dB (1 x) in a high frequency region R.

Figure 9A:
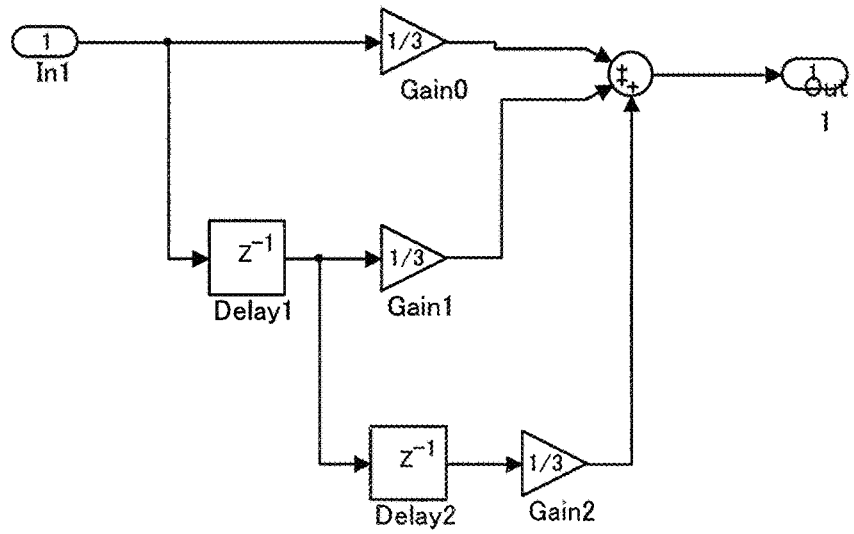
Figure 9B:
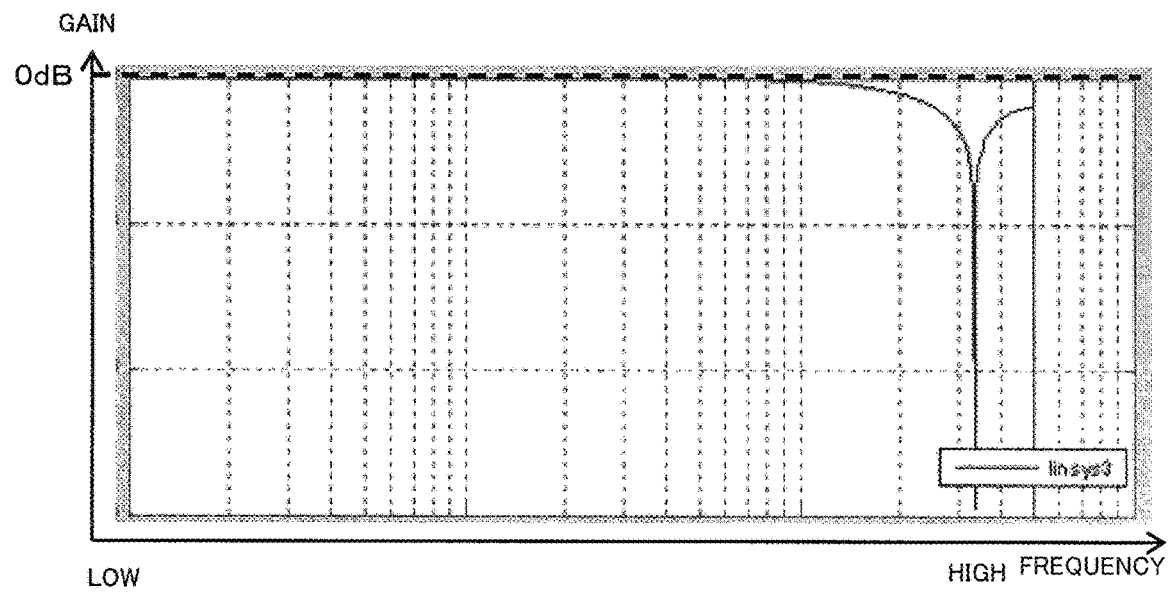

FIG. 9A is a block diagram showing a configuration of a filter B, and FIG. 9B is a diagram showing a frequency characteristic of the filter B. The filter B is configured with delay circuits Delay1 and Delay2, gain ⅓ amplifiers 0 to 2, and an adder circuit as shown in FIG. 9A. When the image data of the phase difference AF detection pixel array is input into an input In from the phase difference pixel generation section 34, filter processing is performed and a signal applied with the frequency characteristic shown in FIG. 9B is output from an output Out1.

The filter B allows not only a high frequency component but also a low frequency component to remain, and thus it is possible to detect the defocus amount in a wide defocus range although the ranging accuracy is not sufficient. That is, the filter B has a frequency characteristic which exhibits approximately flat gain of 0 dB (1 x) from a low frequency to a high frequency as shown in FIG. 9B.

Figure 10:
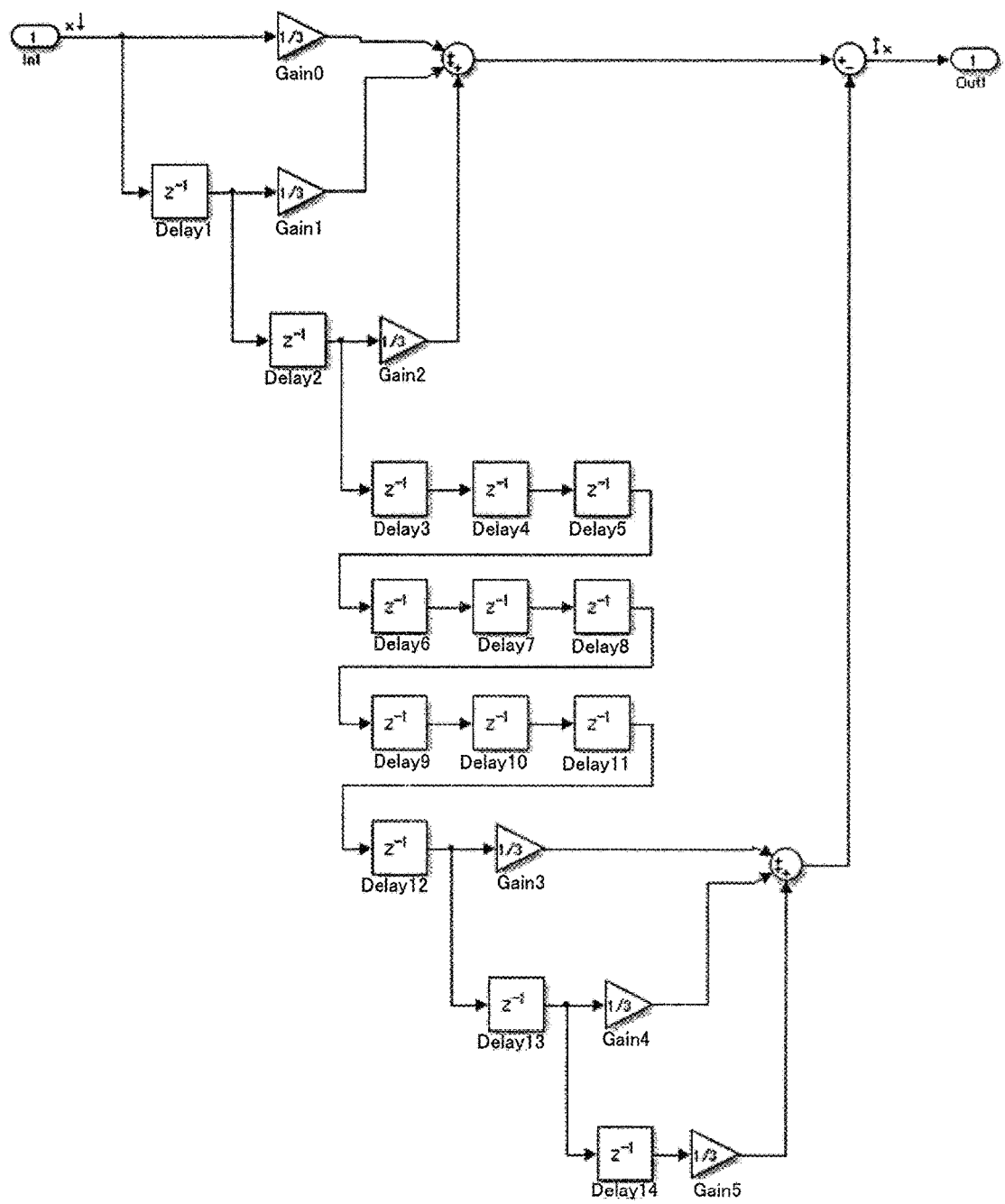
FIG. 10 is a block diagram showing a configuration of a filter C in a camera according to an embodiment of the present invention.
Figure 11:
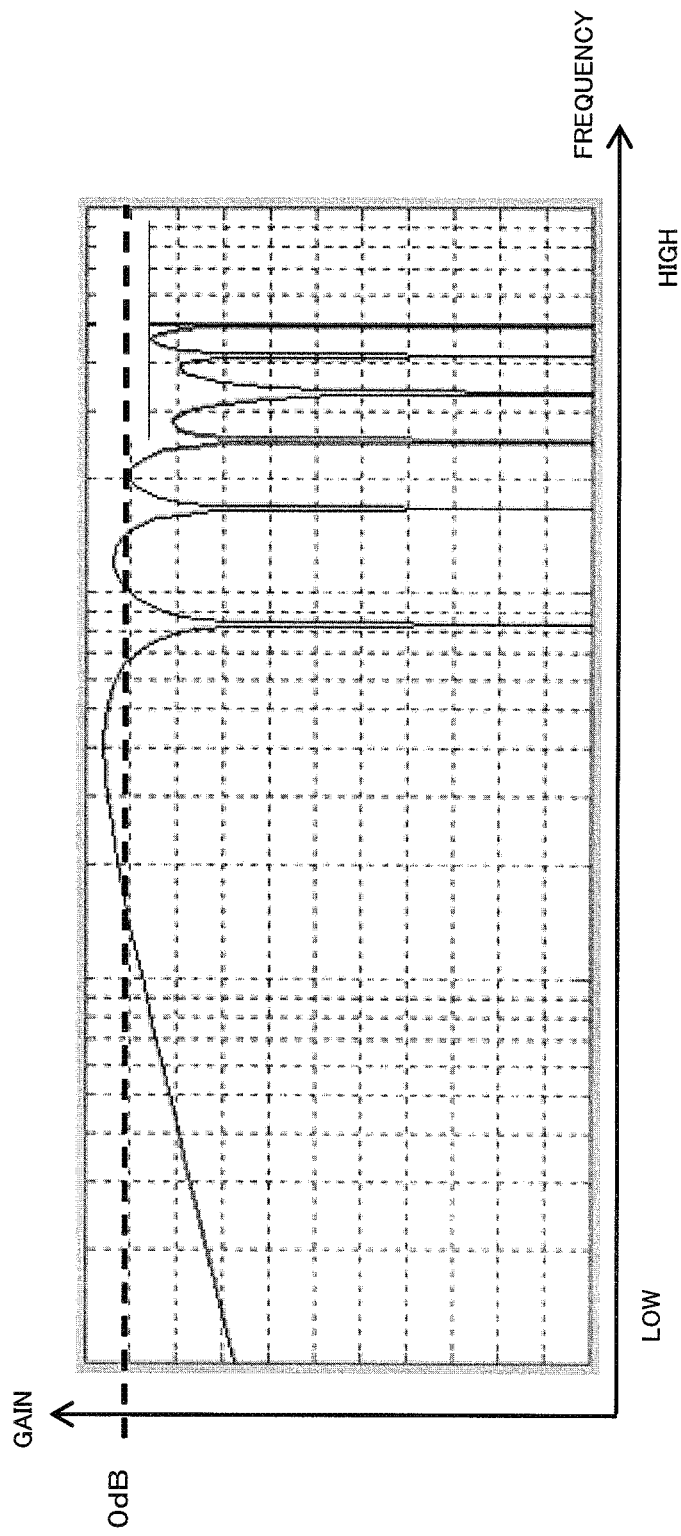
FIG. 11 is a diagram showing a frequency characteristic of a filter C in a camera according to an embodiment of the present invention.

FIG. 10 is a block diagram showing a configuration of a filter C, and FIG. 11 is a diagram showing a frequency characteristic of the filter C. The filter C is configured with delay circuits Delay1 to Delay14, gain ⅓ amplifiers 0 to 5, three adder circuits as shown in FIG. 10. When the image data of the phase difference AF detection pixel array is input into an input In from the phase difference pixel generation section 34, filter processing is performed and a signal applied with the frequency characteristic shown in FIG. 11 is output from an output Out1.

The filter C emphasizes a high frequency component similarly in the filter A, and is used when the ranging accuracy is considered to be important. Note that, the filter C has a frequency characteristic different from that of the filter A and has a gain exceeding 0 dB (1 x) in a different frequency region.

In this manner, the present embodiment includes a plurality of filters as the filters A to C. The plurality of filters functions as a first filter processing section having a predetermined frequency characteristic (e.g., filters A and C) and a second filter processing section having a frequency characteristic which has a larger gain for a low frequency component than the frequency characteristic of the first filter processing section (e.g., filter B).

Next, the filter processing when the image data of the phase difference AF detection pixel array is input will be explained by the use of FIG. 12 to FIG. 14.

Figure 12:
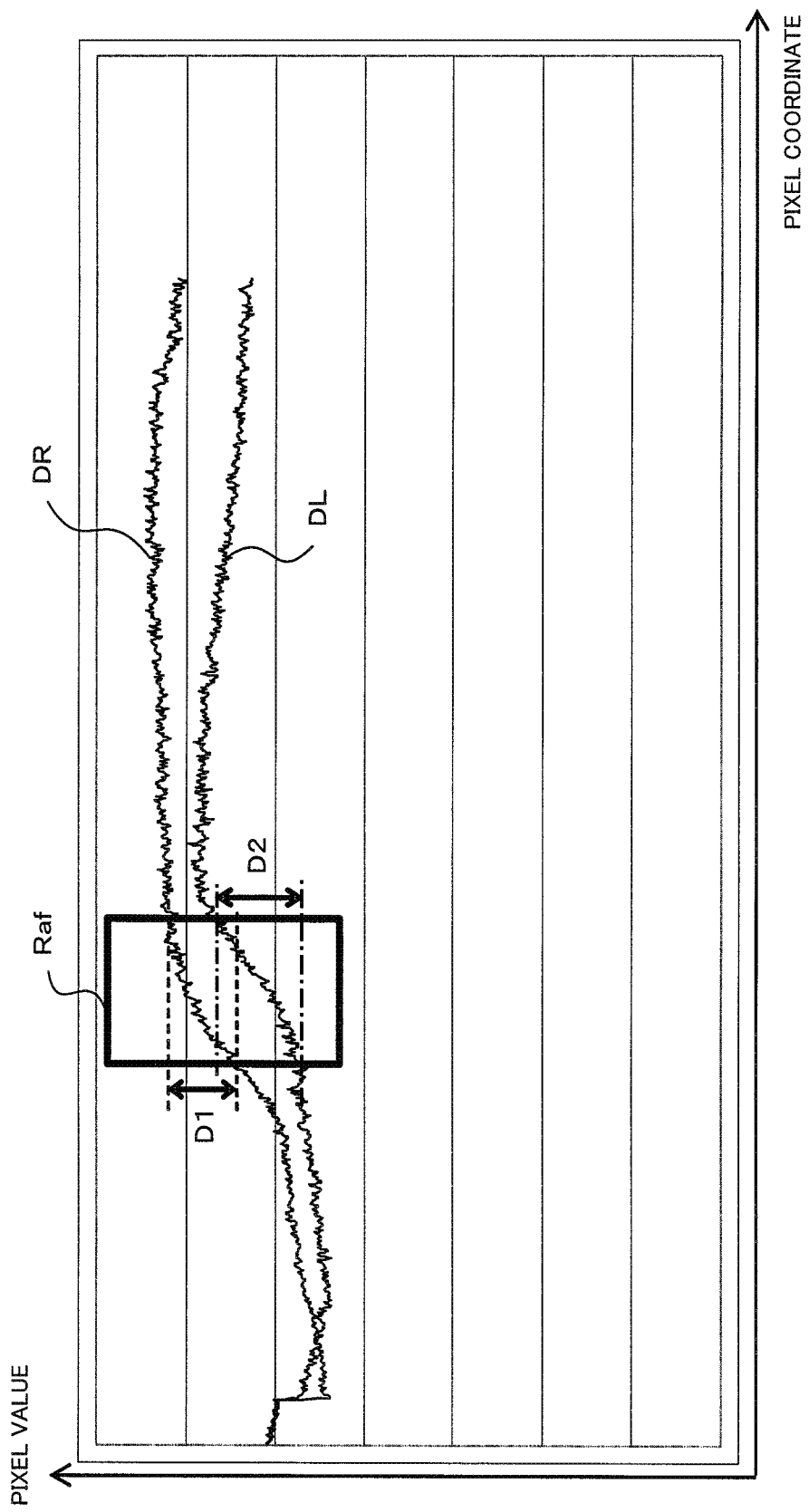
FIG. 12 is a diagram showing image data obtained by pupil-dividing a low-contrast subject image in a largely defocused state by phase difference AF in a camera according to an embodiment of the present invention.

FIG. 12 shows an example of right-and-left phase difference AF pixel data (right and left opening pixel data sequences output from the phase difference pixel generation section 34) when a low-contrast subject is imaged in a largely-defocused state (largely blurred state). In FIG. 12, the horizontal axis represents a pixel coordinate and the vertical axis represents a pixel value. Since the focus lens is not in the focusing state, the pixel values of a right-opening pixel DR and a left-opening pixel DL do not coincide with each other.

An AF ranging area range Raf indicates a ranging area set by the ranging area setting section 35. The contrast value determination section/filter selection section 36 calculates the difference D1 between the maximum value and the minimum value in the right-opening pixel DR within the AF ranging area range Raf and the difference D2 between the maximum value and the minimum value in the left-opening pixel DL within the AF ranging area range Raf, and obtains the addition value of D1 and D2 as a contrast value Dc.

Figure 13:
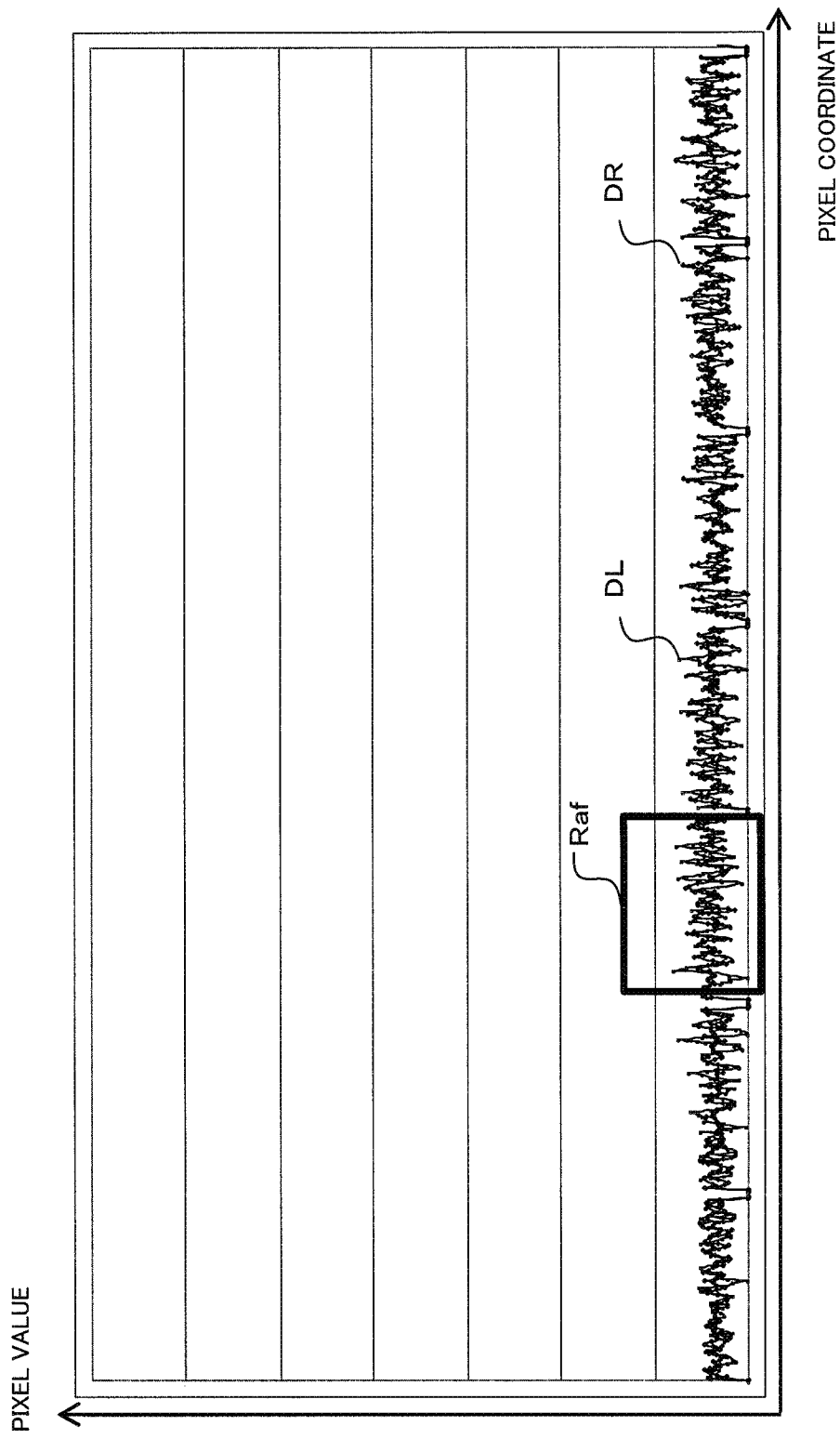
FIG. 13 is a diagram showing image data obtained by performing filter processing with a filter A on the image data shown in FIG. 12, in a camera according to an embodiment of the present invention.

FIG. 13 shows image data obtained by performing filter processing with the filter A on the right-and-left phase difference AF pixel data shown in FIG. 12. Since the filter A emphasizes a high frequency component and suppresses a low frequency component, the low frequency component in the pixel data of FIG. 12 is eliminated and, on the other side, only the high frequency component remains and the edge of the subject image cannot be discriminated. Therefore, when the filter processing is performed using the filter A, it is possible to perform the ranging accurately in the case that the current position of the focus lens is close to the focusing position of a subject and the image thereof has a large high frequency component. However, for the image data of a subject in a largely defocused state as shown in FIG. 12, even if the image data is processed with the filter A, the effect thereof is small and ranging cannot be performed.

Figure 14:
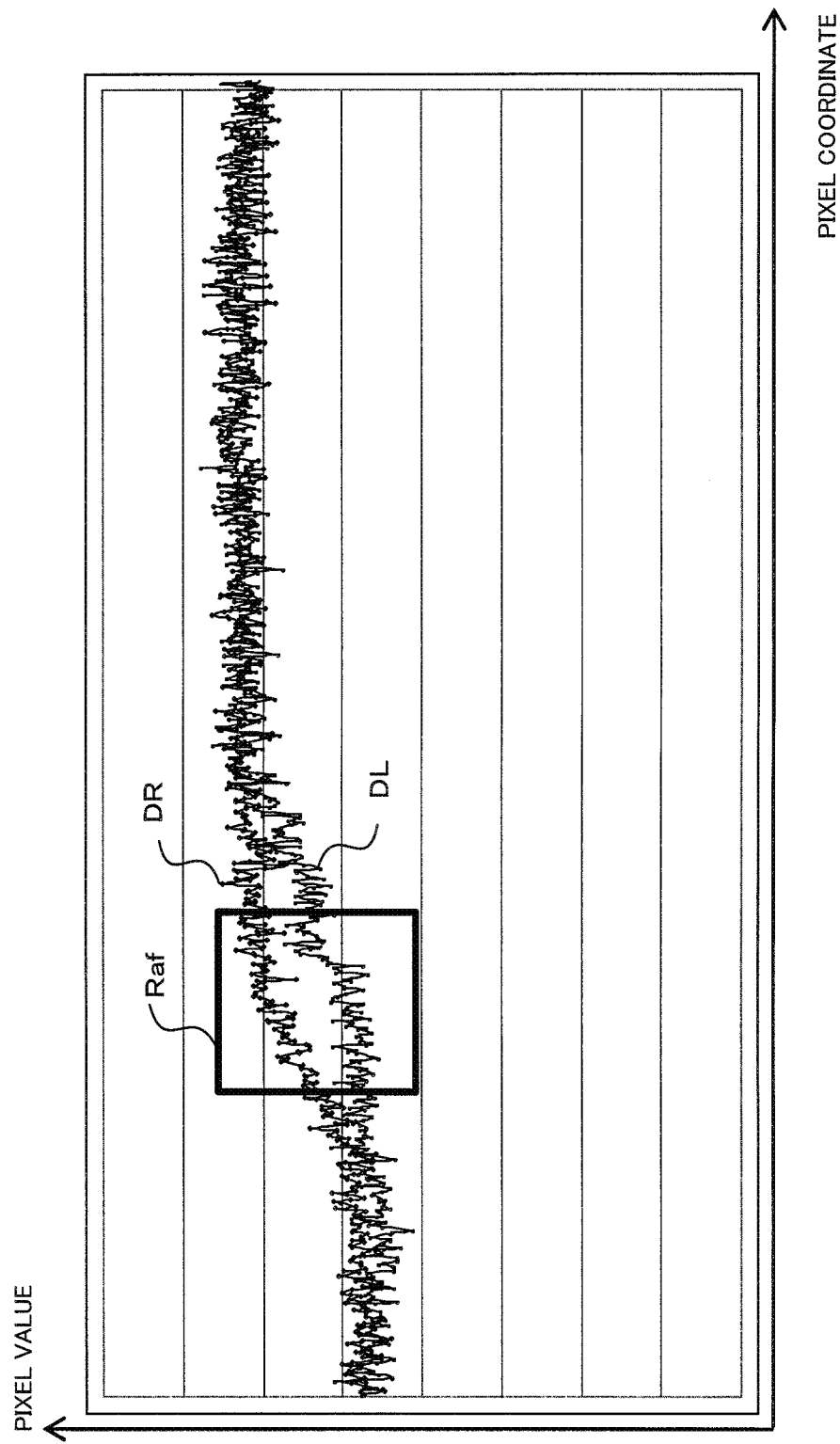
FIG. 14 is a diagram showing image data obtained by performing filter processing with a filter B on the image data shown in FIG. 12, in a camera according to an embodiment of the present invention.

FIG. 14 shows image data obtained by performing filter processing with the filter B on the right-and-left phase difference AF pixel data shown in FIG. 12. Since the filter B allows a low frequency component of the image data also to pass compared with the filter A, the low frequency component in the pixel data of FIG. 12 remains, and the edge of the subject image can be discriminated. Accordingly, although, when the position of the focus lens is close to the focusing position of the subject, the ranging accuracy is lower than in the case of the filter A, it is possible to perform the ranging sufficiently well on the subject image in a largely defocused state as shown in FIG. 12.

In the present embodiment, the plurality of filters is provided and the filter is switched depending on the subject image. As a filter switching method, when the contrast value Dc in the image data of the right and left phase difference AF detection pixel arrays is lower than a predetermined threshold value 1, the normally used filter A is switched to the filter C. Moreover, when the contrast Dc is lower than a threshold value 2, the normally used filter A is switched to the filter B.

In this manner, in the present embodiment, the filter is switched depending on the contrast value of the image data. That is, the calculation section (e.g., defocus amount calculation section/reliability evaluation section 37) performs the calculation by selecting the second filter processing section (e.g., filter B) having a frequency characteristic exhibiting a larger gain for a low frequency component, when the contrast determination result output from the detection section (e.g., contrast value determination section/filter selection section 36) indicates that the contrast is lower than the predetermined value.

Note that, in the present embodiment, the addition value of the differences between the maximum values and the minimum values of the right and left phase difference AF detection pixel arrays within the AF ranging area range Raf is used as the contrast value Dc (Dc=D1+D2). That is, in the correlation calculation of the phase difference AF, the addition value of the difference between the maximum value and the minimum value out of a plurality of pieces of pixel data of the basis part of the image sensor 21 and the difference between the maximum value and the minimum value out of a plurality of pieces of pixel data of the reference part is detected. However, not limited to this case, the contrast value may be obtained by another method. For example, instead of Dc=D1+D2, D1 or D2 may be used. Further, the difference between the maximum value and the minimum value in the center part (except both end pixels) of the AF ranging area may be used.

Figure 15:
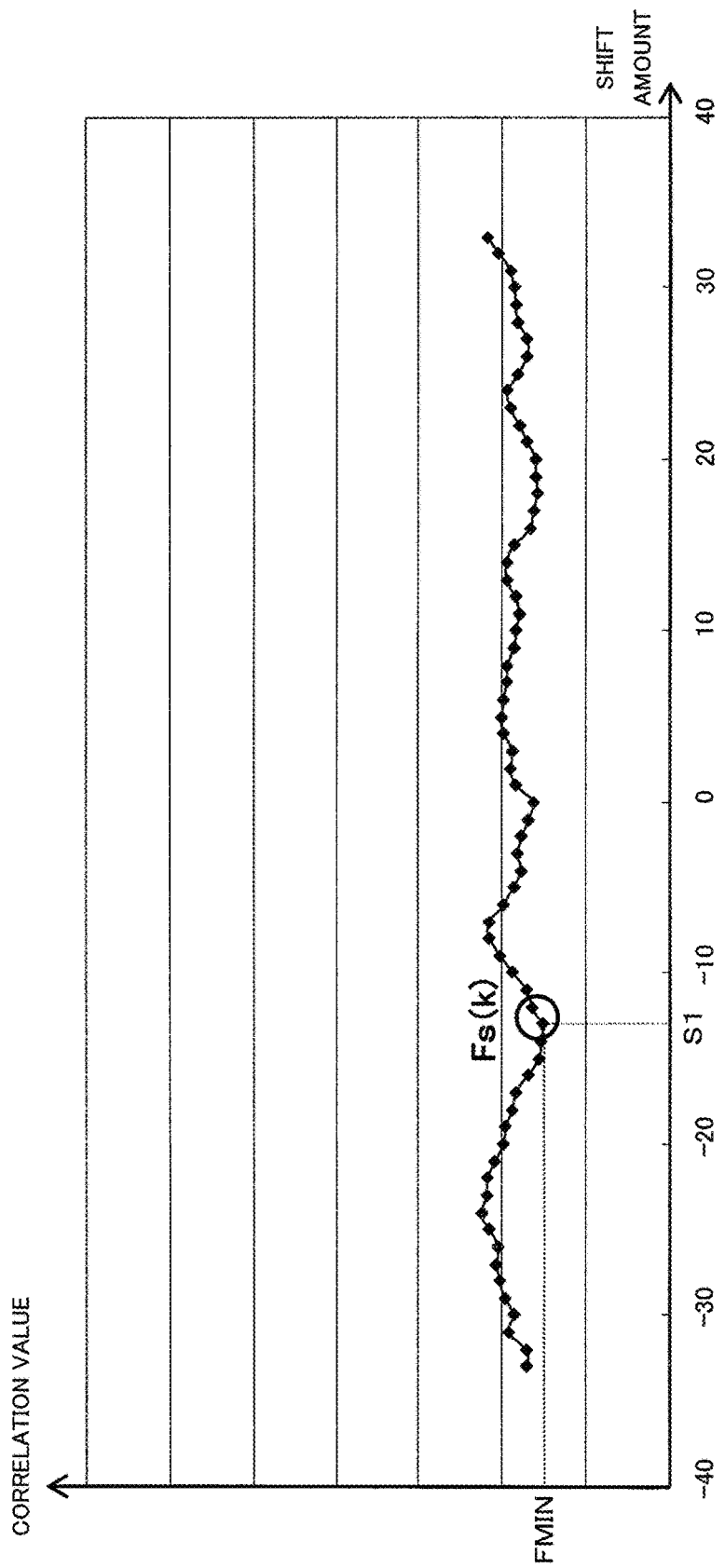
FIG. 15 is a diagram showing an example of a correlation calculation result in the case of a far focusing position in a camera according to an embodiment of the present invention.

Next, the lens drive method selection in the lens drive selection section 38 will be explained by the use of FIG. 15 to FIG. 17. FIG. 15 shows an example of the correlation calculation result when the current position of the focus lens is far from the focusing position, and the horizontal axis represents a shift amount and the vertical axis represents a correlation value. In this example, the correlation value has the minimum value FMIN at a shift amount S1, and, out of the slopes of the straight lines connecting FMIN and correlation values on the right and left sides of FMIN, the slope Fs (k) of the straight line on the right side is larger than the slope of the straight line on the left side.

In the present embodiment, the lens drive method is selected depending on the larger slope (Fs(k)) out of the slopes in the right and left straight lines corresponding to the minimum value FMIN of the correlation value. That is, the larger slope (Fs(k)) is compared with a predetermined threshold value and, when the slope Fs(k) is smaller than the predetermined threshold value, the current position of the focus lens is determined to be far from the focusing position and the lens scan is performed. The lens scan will be described below by the use of FIG. 17.

Figure 16:
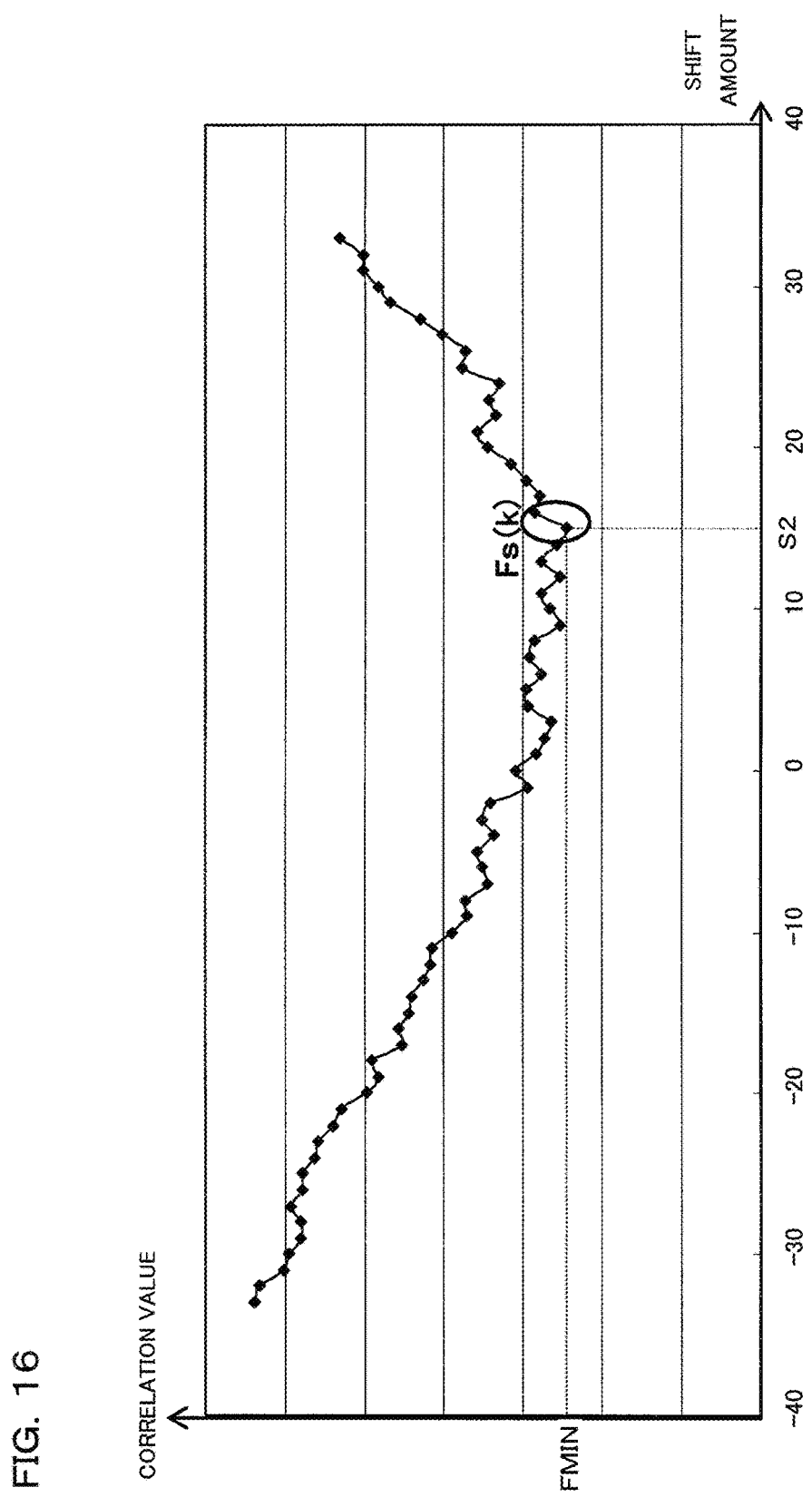
FIG. 16 is a diagram showing an example of a correlation calculation result in the case of a near focusing position in a camera according to an embodiment of the present invention.

FIG. 16 shows an example of the correlation calculation result when the current position of the focus lens is close to the focusing position. In this example, the correlation value has the minimum value FMIN at a shift amount S2, and, out of the slopes of the right and left straight lines corresponding to FMIN, the slope Fs(k) of the straight line on the right side is larger than the slope of the straight line on the left side. In the example shown in FIG. 16, the larger slope (Fs(k)) is compared with the predetermined threshold value, and when the slope Fs (k) is larger than the predetermined threshold value, the current position of the focus lens is close to the focusing position and the defocus drive is performed. The defocus drive means the drive of the focus lens in the defocus amount calculated by the correlation calculation.

When the focusing point cannot be detected because of a low reliability in the ranging result, or when a periodic subject is detected, the lens scan is carried out. The lens scan is the operation of moving the focus lens at a constant speed from one end point side toward the other end point side in a drive range of the focus lens. The example shown in FIG. 17 shows the state that the focus lens is driven from the current position Pa toward the nearest end point (nearest position) Pn, and further driven from the nearest end point (nearest position) Pn toward the infinite end point (infinite position) Pf.

When the lens scan is performed, the pixel value is obtained from the phase difference AF detection pixel and the imaging pixel while the focus lens is driven, and the ranging result by the phase difference AF and the contrast evaluation value are obtained and stored in association with the focus lens position. For example, the pixel value is obtained at the position marked by an inverted triangle in FIG. 17, and the ranging result by the phase difference AF and the contrast evaluation value are obtained. The focus lens is stopped at a position where the reliability of the ranging result is high, and the ranging is performed again.

Next, the filter switching in the photographing when the subject is a moving object or in the photographing when the camera is moved will be explained by the use of FIG. 18A and FIG. 18B.

FIG. 18A shows a state of photographing a moving object. That is, after focusing is performed at a position O1 for a moving subject Ob in the state in which a camera frame F is fixed, the subject Ob moves to a position O2. When a ranging-disable state continues for a certain time, it becomes difficult to perform the phase difference AF because of a large defocus amount. In such a case, by changing the filter A to the filter B, it becomes possible to perform the ranging again.

Further, since, when the lens scan drive is repeated many times, it provides an unpleasant feeling for a photographer, generally, when the lens scan is finished once, the state is set to a flag so as not to allow the lens scan to be repeated. In the state as shown in FIG. 18A, however, even when the lens scan is finished once, the lens scan may be also made available again by the clear of the flag indicating the state.

FIG. 18B shows a state in which the camera is panned following the motion of the subject Ob and a frame F1 is changed to a frame F2 when the moving subject Ob is photographed. In such a case, there is a case that the focusing cannot be performed and a ranging-disable state continues. When the ranging-disable state continues for a certain time, the phase difference AF might be difficult to perform because of a low contrast or a large defocus amount of the subject. In such a case, by changing the filter A to the filter B, sometimes it becomes possible to make the ranging available again.

Further, in the case that the ranging-disable state continues for a certain time even if the filter is changed, by the clear of the flag indicating lens scan completion state, the lens scan may be made available again. Here, the flag clearing is waited for a certain time so as not to provide the unpleasant feeling for the user.

Next, the operation of the phase difference AF in the present embodiment will be explained by the use of FIG. 19 and FIG. 20. Note that this flow is carried out by the CPU (Central Processing Unit) and the like within the AF calculation section 23 to control each of the sections shown in FIG. 1 and FIG. 2 according to a program stored in the non-volatile memory (not shown in the drawings).

Figure 19:
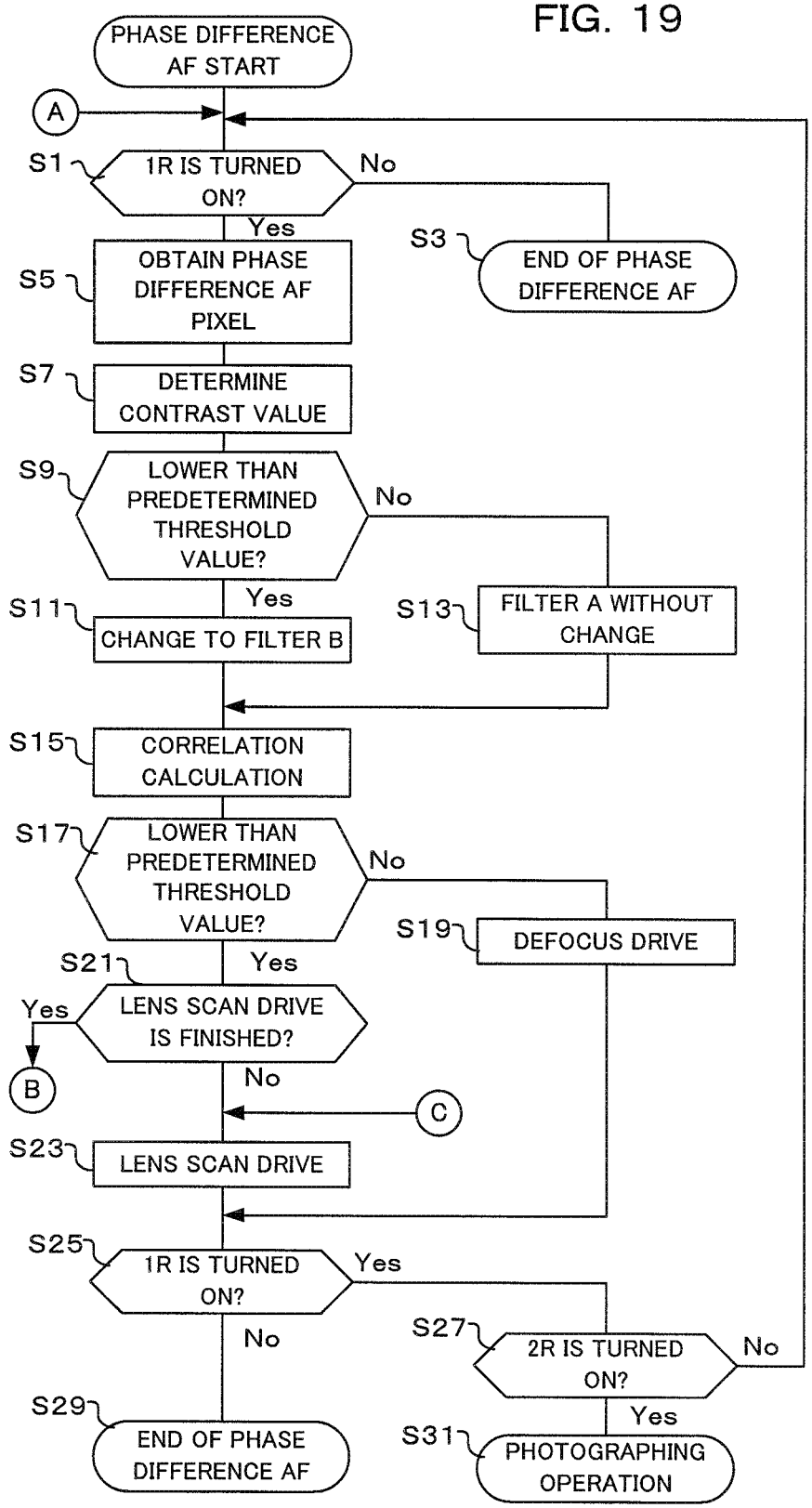
FIG. 19 is a flowchart showing the operation of phase difference AF in a camera according to an embodiment of the present invention.
Figure 20:
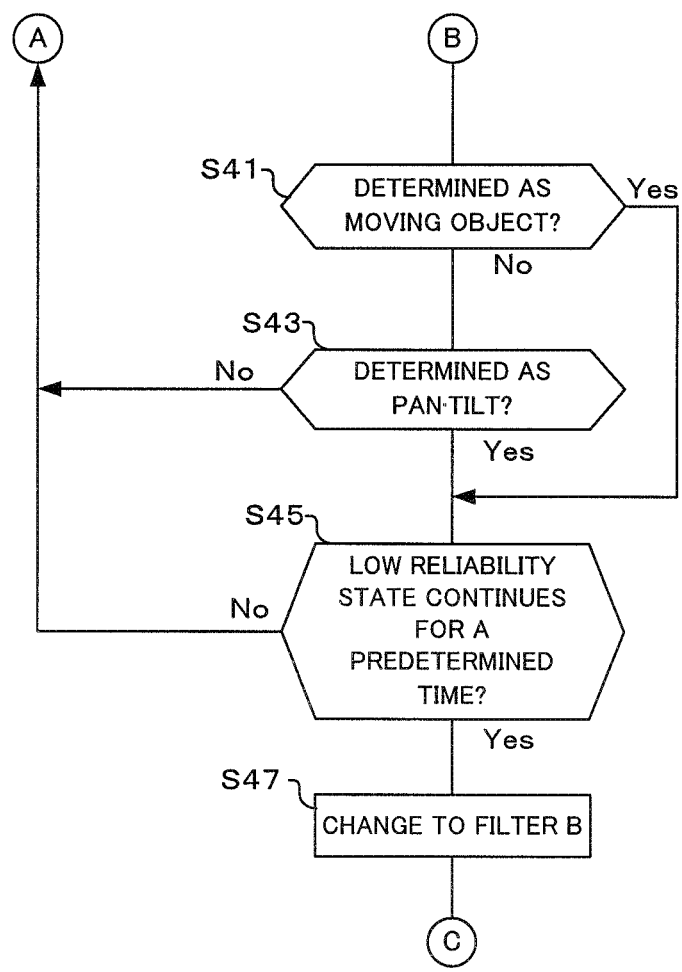
FIG. 20 is a flowchart showing the operation of phase difference AF in a camera according to an embodiment of the present invention.

When entering the phase difference AF flow shown in FIG. 19, first, it is determined whether 1R is turned on or not (S1). 1R is a switch which is turned on in response to the half-press operation of a release button. In this step, the determination is performed depending on the state of this switch. When 1R is not turned on as this determination result, the phase difference AF flow is terminated (S3).

When 1R is turned on as the determination result of step S1, the phase difference AF pixel is obtained (S5). As described above, the image sensor 21 includes the phase difference AF detection pixel and the imaging pixel. In this step, the pixel value is obtained from the phase difference AF detection pixel.

When the phase difference AF pixel has been obtained, next, the determination of the contrast value is performed (S7). Here, the contrast value determination section/filter selection section 36 calculates the contrast value using the pixel value of the phase difference AF detection pixel from the phase difference pixel generation section 34. As the contrast value, as explained by the use of FIG. 12, the sum Dc of the differences between the maximum values and the minimum values within the ranging area may be calculated, for example, and also another value such as an accumulated sum of the differences between the neighboring pixels may be calculated by a publicly known method, for example.

When the contrast value has been obtained in step S7, next, it is determined whether the contrast value is lower than the predetermined threshold value or not (S9). Here, the determination is performed by the comparison between the contrast value obtained in step S7 and the predetermined threshold value. Since this determination is performed on the selection of the filter A or B, the threshold value may be set depending on the filter characteristics.

Note that, while one threshold value is used for the selection of the two kinds of filters A and B in the flow shown in FIG. 19, if the filter C explained by the use of FIG. 10 and FIG. 11 can be selected, two threshold values are prepared. That is, the number of threshold values may be the same as the number of available filters. Further, while it is determined whether "lower or not" in step S9, not limited to this case, it may be determined whether "the same or lower" or not. This is the same also in step S17 to be described below.

When the contrast value is lower than the predetermined threshold value as the determination result of step S9, the filter is changed to the filter B (S11). Since the contrast value is lower than the predetermined threshold value and the contrast is low correspondingly to a largely blurred (large defocus amount) case, the filter is changed to the filter B having a frequency characteristic as shown in FIG. 9B. Since the filter B allows the low frequency component of the image data to remain compared with the filter A, even for the largely blurred subject, it becomes easy to calculate the defocus amount by the phase difference AF.

On the other side, when the contrast value is not lower than the predetermined threshold value as the determination result of step S9, the filter A is used without change (S13). Since the contrast value is not lower than the predetermined threshold value and the subject image has a sufficient contrast, in this case, the filter A having a frequency characteristic as shown in FIG. 8B is used continuously. Since the filter A emphasizes a high frequency component of the image data compared with the filter B, it is possible to calculate the defocus amount accurately.

When the filter selection has been performed in step S11 or S13, next, the correlation calculation is performed (S15). Here, the defocus amount calculation section/reliability evaluation section 37 performs the correlation calculation after performing the filter processing on the image data (pixel values) of the phase difference AF detection pixel array output from the phase difference pixel generation section 34 using the filter selected in step S11 or S13.

After the correlation calculation, next, it is determined whether the result shows a value smaller than a predetermined threshold value or not (S17). Here, it is determined whether the slope Fs(k) expressing the reliability calculated in the correlation calculation in step S15 is smaller than the predetermined threshold value or not. As described by the use of FIG. 7, the maximum value of the slopes of the straight lines neighboring the minimum value of the correlation calculation value is the slope Fs(k) expressing the reliability. Further, as explained by the use of FIG. 15 and FIG. 16, the slope Fs (k) is compared with the predetermined threshold value, and, when the slope Fs (k) is smaller than the predetermined threshold value, it is determined that the current position of the focus lens is far from the focusing position. On the other side, when the slope Fs (k) is larger than the predetermined threshold value, it is determined that the position is close to the focusing position. Note that, there are various detection methods for an index expressing the reliability of the correlation calculation, a difference between a plurality of correlation calculation values may be employed, and further a normalized value of this difference divided by the minimum value FMIN of the correlation calculation value may be employed.

When the slope Fs (k) is not smaller than the predetermined threshold value as the determination result of step S17, the defocus drive is performed (S19). Here, the lens control section 13 performs the drive of the focus lens within the photographing lens 11 in an amount corresponding to the defocus amount using the defocus amount obtained in the correlation calculation in step S15.

When the slope Fs (k) is smaller than the predetermined threshold value as the determination result in step S17, it is determined whether the lens scan drive is finished or not (S21). Since the slope Fs (k) is smaller than the predetermined threshold value as the result of the correlation calculation, this is the case that the current position of the focus lens is determined to be far from the focusing position. In this case, while the focusing position is found by the lens scan, the repeat of the lens scan is unpleasant for the photographer. Accordingly, in the present embodiment, except the case of a moving object and the case of moving the camera, the lens scan is assumed to be performed only once after 1R is turned on.

When the lens scan drive is not finished as the determination result of step S21, the lens scan drive is performed (S23). Here, as explained by the use of FIG. 17, for example, the pixel value is obtained from the phase difference AF detection pixel and the imaging pixel while the focus lens is driven at a constant speed from one end point side toward the other end point side in the drive range of the focus lens, and the ranging result of the phase difference AF and the contrast evaluation value are obtained and stored in association with the lens position.

On the other side, when the lens scan drive is finished as the determination result of step S21, it is determined whether the subject is a moving object or not (S41). Here, the image processing section 22 determines whether the subject is a moving object or not, using a pixel array of the imaging pixel (normal pixel). The subject Ob shown in above FIG. 18A is an example of the moving object.

When the subject is not a moving object as the determination result of step S41, it is determined whether pan•tilt operation is performed or not (S43). The pan operation means an action of swinging the camera horizontally and the tilt operation means an action of swinging the camera vertically. A gyro sensor (not shown in the drawings) or the like is provided within the camera for detecting the motion of the camera, and it is determined whether the pan or tilt operation is performed or not according to the output from this sensor. Above FIG. 18B shows an example of the pan•tilt operation.

When the subject is determined to be a moving object in step S41, or when the pan•tilt operation is determined to be performed in step S43, it is determined whether the low-reliability state has continued for a predetermined time or not (S45). As explained by the use of FIG. 18A and FIG. 18B, when the subject is a moving object or when the pan•tilt operation is performed, the ranging-disable state might continue. Accordingly, in this step, it is determined whether such a low reliability state has continued for the predetermined time or not, depending on the slope Fs(k) in the correlation calculation.

When the pan•tilt operation is not performed as the determination result of step S43, or when the low reliability state does not continue as the determination result of step S45, the process returns to step S1 and the above operation is performed.

On the other side, when the low reliability state has continued for the predetermined time as the determination result of step S45, the filter is changed to the filter B (S47) as in step S11. Since the processing by the filter B allows a low frequency component to remain sufficiently in the image data (pixel value) of the phase difference AF detection pixel array compared with the processing by the filter A, it becomes easy to calculate the defocus amount by the phase difference AF even for a largely blurred subject.

When the filter has been changed to the filter B in step S47, the process goes to step S23, and the lens scan drive is performed. As described above, when the subject is a moving object and when the pan•tilt operation is performed, the lens scan is allowed to be repeated.

When the lens scan drive has been performed in step S23, or when the defocus drive has been performed in step S19, next, it is determined whether 1R is turned on or not (S25) as in step S1. When 1R is turned off as this determination result, this indicates a state in which a finger leaves the release button, and the phase difference AF flow is terminated (S29).

When 1R is turned on as the determination result in step S25, next, it is determined whether 2R is turned on or not (S27). 2R is a switch which is turned on in response to the complete press of the release button. In this step, the determination is made depending on the state of the switch. When 2R is not turned on as this determination result, the process returns to step S1 and the above operation is performed.

On the other side, when 2R is turned on as the determination result of step S27, photographing operation is performed (S31). Here, for an exposure time which is determined by shutter speed, the image sensor 21 is exposed by the subject image, the pixel value of the imaging pixel (normal pixel) is read out from the image sensor 21 after the exposure time has elapsed, the image processing is performed in the image processing section 22, and then the image-processed image data is recorded into the recording section 24.

In this manner, in the phase difference AF flow of the present embodiment, the optimum filter is selected from among the plurality of filters depending on the contrast value (S7 to S13). That is, when the contrast value is lower than the predetermined value, the filter B having a frequency characteristic which exhibits a larger gain for a low frequency component is selected. Accordingly, it is possible to generate the optimum pixel data for the correlation calculation depending on the state of the subject while securing a sufficient accuracy.

Further, in the present flow, it is switched whether to perform the defocus drive or the lens scan drive, depending on the reliability of the correlation calculation result (S15 to S23). That is, when the reliability is high, the defocus drive is performed (S19), and, when the reliability is low, the lens scan drive is performed (S23). Accordingly, it is possible to perform the lens drive depending on the reliability to optimize the accuracy and the focusing speed.

Further, in the present flow, when the subject is a moving object or when the pan•tilt operation is performed, the filter B having a frequency characteristic which exhibits a larger gain for a low frequency component is selected.

That is, the present embodiment includes a moving object discrimination section to determine whether the subject is a moving object or not and a pan•tilt detection section to detect the pan or tilt operation of the focal point detection device, and determines whether the subject is a moving object or not (example of FIG. 18A), or whether the camera is being moved or not as in the pan•tilt operation (example of FIG. 18B). In the present embodiment, when the low reliability is determined continuously for a time longer than the predetermined time by the reliability determination section (e.g., defocus amount calculation section/reliability evaluation section 37) while the subject is determined to be a moving object by the moving object discrimination section and also the operation is performed by selecting the first filter processing section (e.g., filter A), the operation is configured to be performed by selecting the second filter processing section (e.g., filter B) (e.g., S41, S45, and S47).

Further, the present embodiment includes the pan•tilt detection section to detect the pan or tilt operation of the focal point detection device, and determines whether the camera is being moved as in the pan•tilt operation (example of FIG. 18B). In the present embodiment, when the low reliability is determined continuously for a time longer than the predetermined time by the reliability determination section (e.g., defocus amount calculation section/reliability evaluation section 37) while the pan•tilt detection section determines that the pan•tilt operation is performed and also the operation is performed by selecting the first filter processing section (e.g., filter A), the operation is configured to be performed by selecting the second filter processing section (e.g., filter B) (e.g., S43 to S47).

In this manner, in the present embodiment, it is possible to cause the ranging-disable state not to occur easily even when the subject is a moving object, or when the camera is being moved. Further, in this case, it is made easy to find the focusing point by performing the lens scan drive.

As explained above, in an embodiment of the present invention, any one of the plurality of filter sections is selected depending on the contrast value of the pixel data, the correlation calculation is performed using the pixel data filtered with this selected filter section, and the defocus amount is calculated. Accordingly, the filter is selected appropriately even for a largely blurred subject, and thereby it is possible to perform the focusing quickly. That is, the focus lens needs not be moved once for the defocus amount calculation, and it is possible to reduce the time necessary for focal point detection in a time corresponding to the time reduction in this quick focusing.

Note that, while the pixel value of the phase difference AF detection pixel is used as the contrast value for the determination in an embodiment of the present invention, not limited to this case, obviously the pixel value of the imaging pixel (normal pixel) may be used for the calculation, for example. Further, while the phase difference AF detection pixels are provided on the image sensor 21 for generating the two divided subject images, not limited to this case, obviously the subject light flux may be divided by a half mirror or the like and this divided subject light flux may be divided into two images.

Further, while each of the filters A to C is configured using a circuit element of a delay circuit and the like in an embodiment of the present invention, the filter is not limited to the circuit shown in FIG. 8A to FIG. 10 if the filter is a circuit having a different frequency characteristic. Further, the filter is not limited to the hardware circuit, and obviously may be configured in a software manner. Moreover, the number of filters may be plural and may be three or more.

Further, in an embodiment of the present invention, the whole or a part of the function in each of the lens control section 13, the image processing section 22, and the AF calculation section 23 obviously may be realized by a CPU (Central Processing Unit), a peripheral circuit, and a program code, may be realized by a circuit in which execution is carried out by a program code, such as a DSP (Digital Signal Processor), may be realized by a hardware configuration such as a gate circuit generated based on a program language described by Verilog, or may be carried out by a hardware circuit.

Further, while the explanation is made by the use of a digital camera as a device for photographing in an embodiment of the present invention, the camera may be a digital single lens reflex camera, a compact digital camera, a motion picture camera such as a video camera and a movie camera, or further a camera built in a mobile phone, a smart phone, a mobile information terminal (PDA: Personal Digital Assist), a personal computer (PC), a tablet type computer, a game machine or the like. In any case, the present invention can be applied if the phase difference AF method is employed.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focal point detection device, comprising:
an image sensor having a focal point detection pixel where an incident direction of an incident light flux is restricted and an imaging pixel where the incident direction of the incident light flux is not restricted;
a pixel data generation section to generate focal point detection pixel data of a basis part and a reference part corresponding to a predetermined AF area using an output of the focal point detection pixel;
a plurality of filter sections having different frequency characteristics to perform filter processing on the pixel data;
a detection section to detect contrast of subject image data configured with a plurality of pieces of pixel data of the basis part and the reference part;
a calculation section to select a filter section from among the plurality of filter sections depending on the contrast output by the detection section, to perform correlation calculation using pixel data obtained by performing filter processing on the pixel data of the basis part and the reference part with the selected filter section, and to calculate a defocus amount;
a moving object discrimination section to discriminate whether a subject is a moving object or not, using imaging data output from the imaging pixel; and
a reliability determination section to determine reliability of an output from the calculation section, wherein
the plurality of filter sections includes a first filter processing section having a predetermined frequency characteristic and a second filter processing section having a frequency characteristic which exhibits a larger gain for a low frequency component than the frequency characteristic of the first filter processing section,
the calculation section selects the second filter processing section to perform calculation when the contrast output by the detection section is lower than a predetermined value, and
the calculation section selects the second filter processing section to perform calculation when the moving object determination section determines that the subject is a moving object while the correlation calculation by the calculation section and the reliability determination by the reliability determination section are carried out repeatedly on the basis of pixel data obtained by repeatedly performing imaging operation by the image sensor, and also when the reliability determination section continues to determine that reliability is low for a predetermined time or longer while the calculation section selects the first filter processing section to perform calculation,
wherein the detection section detects an addition value of a difference between a maximum value and a minimum value out of a plurality of pieces of pixel data of the basis part and a difference between a maximum value and a minimum value out of a plurality of pieces of pixel data of the reference part.

2. The focal point detection device according to claim 1, wherein,
out of outputs from a plurality of the focal point detection pixels corresponding to the basis part and the reference part corresponding to the AF area, the pixel data generation section calculates an average value of outputs from the focal point detection pixels for each arrangement of the focal point detection pixels arranged in a direction perpendicular to an arrangement direction of the basis part and the reference part for each arrangement, to obtain the pixel data.

3. The focal point detection device according to claim 1, wherein
the reliability determination section obtains a minimum value and correlation values neighboring the minimum value from a plurality of correlation values output by the calculation section, and determines reliability by comparing a larger difference out of differences between the minimum value and the neighboring correlation values with a predetermined threshold value.

4. A focal point detection device, comprising:
an image sensor having a focal point detection pixel where an incident direction of an incident light flux is restricted;
a pixel data generation section to generate focal point detection pixel data of a basis part and a reference part corresponding to a predetermined AF area using an output of the focal point detection pixel;
a plurality of filter sections having different frequency characteristics to perform filter processing on the pixel data;
a detection section to detect contrast of subject image data configured with a plurality of pieces of pixel data of the basis part and the reference part;
a calculation section to select a filter section from among the plurality of filter sections depending on the contrast output by the detection section, to perform correlation calculation using pixel data obtained by performing filter processing on the pixel data of the basis part and the reference part with the selected filter section, and to calculate a defocus amount;
a pan•tilt detection section to detect pan or tilt operation of the focal point detection device; and
a reliability determination section to determine reliability of an output from the calculation section, wherein
the calculation section selects the second filter processing section to perform calculation when the moving object determination section determines that the pan•tilt detection section determines that pan•tilt operation is performed while the correlation calculation by the calculation section and the reliability determination by the reliability determination section are carried out repeatedly on the basis of pixel data obtained by repeatedly performing imaging operation by the image sensor, and also when the reliability determination section continues to determine that reliability is low for a predetermined time or longer while the calculation section selects the first filter processing section to perform calculation,
wherein the detection section detects an addition value of a difference between a maximum value and a minimum value out of a plurality of pieces of pixel data of the basis part and a difference between a maximum value and a minimum value out of a plurality of pieces of pixel data of the reference part.

5. The focal point detection device according to claim 4, wherein,
out of outputs from a plurality of the focal point detection pixels corresponding to the basis part and the reference part corresponding to the AF area, the pixel data generation section calculates an average value of outputs from the focal point detection pixels for each arrangement of the focal point detection pixels arranged in a direction perpendicular to an arrangement direction of the basis part and the reference part for each arrangement, to obtain the pixel data.

6. The focal point detection device according to claim 4, wherein
the reliability determination section obtains a minimum value and correlation values neighboring the minimum value from a plurality of correlation values output by the calculation section, and determines reliability by comparing a larger difference out of differences between the minimum value and the neighboring correlation values with a predetermined threshold value.

7. A focal point detection method of a focal point detection device including an image sensor having a focal point detection pixel where an incident direction of an incident light flux is restricted and an imaging pixel where the incident direction of the incident light flux is not restricted, and a plurality of filter sections having different frequency characteristics to perform filter processing on the pixel data, wherein the plurality of filter sections includes a first filter processing section having a predetermined frequency characteristic and a second filter processing section having a frequency characteristic which exhibits a larger gain for a low frequency component than the frequency characteristic of the first filter processing section, the method comprising:
generating focal point detection pixel data of a basis part and a reference part corresponding to a predetermined AF area using an output of the focal point detection pixel;
detecting contrast of subject image data configured with a plurality of pieces of pixel data of the basis part and the reference part;
selecting a filter section from among the plurality of filter sections depending on the detected contrast;
performing correlation calculation using pixel data obtained by performing filter processing on the pixel data of the basis part and the reference part with the selected filter section, to calculate a defocus amount; and
selecting the second filter processing section to perform calculation when a subject is determined to be a moving object on the basis of imaging data output from the imaging pixel while the correlation calculation and reliability determination of the correlation calculation are carried out repeatedly on the basis of pixel data obtained by repeatedly performing imaging by the image sensor, and also when it is continued to be determined that reliability is low in the result of operation for a predetermined time or longer while the first filter processing section is selected and the calculation is performed,
wherein an addition value of a difference between a maximum value and a minimum value out of a plurality of pieces of pixel data of the basis part and a difference between a maximum value and a minimum value out of a plurality of pieces of pixel data of the reference part is detected.

8. The focal point detection method according to claim 7, wherein,
in generation of the pixel data, out of outputs from a plurality of focal point detection pixels in the basis part and the reference part corresponding to the AF area, an average value of outputs from the focal point detection pixels of each arrangement is calculated for each arrangement of the focal point detection pixels arranged in a direction perpendicular to an arrangement direction of the basis part and the reference part, to give the pixel data.

9. The focal point detection method according to claim 7, wherein, in the reliability determination, a minimum value and correlation values neighboring the minimum value are obtained from a plurality of correlation values calculated from the correlation calculation, and reliability is determined by comparing a larger difference out of differences between the minimum value and the neighboring correlation values with a predetermined threshold value.

10. A focal point detection method of a focal point detection device including an image sensor having a focal point detection pixel where an incident direction of an incident light flux is restricted, a plurality of filter sections having different frequency characteristics to perform filter processing on the pixel data, wherein the plurality of filter sections includes a first filter processing section having a predetermined frequency characteristic and a second filter processing section having a frequency characteristic which exhibits a larger gain for a low frequency component than the frequency characteristic of the first filter processing section, and a pan•tilt detection section to detect pan or tilt operation of the focal point detection device, the method comprising:

generating focal point detection pixel data of a basis part and a reference part corresponding to a predetermined AF area using an output of the focal point detection pixel;

detecting contrast of subject image data configured with a plurality of pieces of pixel data of the basis part and the reference part;

selecting a filter section from among the plurality of filter sections depending on the detected contrast;

performing correlation calculation using pixel data obtained by performing filter processing on the pixel data of the basis part and the reference part with the selected filter section, to calculate a defocus amount; and selecting the second filter processing section to perform the correlation calculation when the pan•tilt detection section determines that a pan•tilt operation is performed while the correlation calculation and reliability determination of the correlation calculation are carried out repeatedly on the basis of pixel data obtained by repeatedly performing imaging by the image sensor, and also when it is continued to be determined that the reliability is low for a predetermined time or longer while the first filter processing section is selected and the correlation calculation is performed, wherein an addition value of a difference between a maximum value and a minimum value out of a plurality of pieces of pixel data of the basis part and a difference between a maximum value and a minimum value out of a plurality of pieces of pixel data of the reference part is detected.

11. The focal point detection method according to claim 10, wherein, in generation of the pixel data, out of outputs from a plurality of focal point detection pixels in the basis part and the reference part corresponding to the AF area, an average value of outputs from the focal point detection pixels of each arrangement is calculated for each arrangement of the focal point detection pixels arranged in a direction perpendicular to an arrangement direction of the basis part and the reference part, to give the pixel data.

12. The focal point detection method according to claim 10, wherein in the reliability determination, a minimum value and correlation values neighboring the minimum value are obtained from a plurality of correlation values calculated from the correlation calculation, and reliability is determined by comparing a larger difference out of differences between the minimum value and the neighboring correlation values with a predetermined threshold value.

* * * * *